(12) United States Patent
Osaka

(10) Patent No.: US 7,210,017 B2
(45) Date of Patent: Apr. 24, 2007

(54) INFORMATION PROCESSING APPARATUS, MEMORY, INFORMATION PROCESSING METHOD, AND PROGRAM

(75) Inventor: Masataka Osaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/818,166

(22) Filed: Apr. 5, 2004

(65) Prior Publication Data

US 2004/0250012 A1 Dec. 9, 2004

(30) Foreign Application Priority Data

Apr. 8, 2003 (JP) ............................. 2003-104546

(51) Int. Cl.
*G06F 12/00* (2006.01)

(52) U.S. Cl. ..................... 711/168; 711/105; 711/154; 711/167

(58) Field of Classification Search ................ 711/168, 711/105, 167, 154
See application file for complete search history.

(56) References Cited

U.S. PATENT DOCUMENTS

| 5,467,460 A | * | 11/1995 | Patel ........................... 711/143 |
| 5,680,643 A | * | 10/1997 | Flynn ........................... 710/35 |
| 6,381,684 B1 | * | 4/2002 | Hronik et al. .............. 711/167 |
| 6,532,523 B1 | * | 3/2003 | Mogili ........................ 711/168 |
| 6,754,126 B2 | * | 6/2004 | Yamaguchi et al. ......... 365/222 |
| 7,069,406 B2 | * | 6/2006 | Hronik ....................... 711/168 |

FOREIGN PATENT DOCUMENTS

| JP | 11-264985 | | 9/1999 |
| JP | 2000-267985 A | * | 9/2000 |
| JP | 2001-092714 | | 6/2001 |

* cited by examiner

*Primary Examiner*—Stephen C. Elmore

(57) ABSTRACT

A memory control unit and a memory unit is connected to each other by a bus used for transfer of address, data and control signals. The memory control unit outputs a first command including a first predetermined location in the memory unit, to the memory unit. The memory control unit outputs a second command including a second predetermined location in the memory unit, to the memory unit when a predetermined time period has elapsed since the output of the first command.

11 Claims, 14 Drawing Sheets

INFORMATION PROCESSING APPARATUS, MEMORY, INFORMATION PROCESSING METHOD, AND PROGRAM

This application is based on an application No. 2003-104546 filed in Japan, the content of which is hereby incorporated by reference.

BACKGROUND OF THE INVENTION (1) Field of the Invention

The present invention relates to an information processing apparatus in which data is written/read to/from a memory, especially to an information processing apparatus in which the same signal lines are shared for transmitting address signals, data signals and control signals.

(2) Description of the Related Art

A Synchronous Dynamic Random Access Memory (SDRAM) is used for a main storage device in home audio-video equipments such as personal computers and digital televisions.

A CPU included in home audio-video equipments has a cache memory that achieves a higher transfer rate than an SDRAM. A CPU reads data from an SDRAM, and stores the read data in a cache memory before using it.

Here, when a cache memory requests data from an SDRAM, it additionally reads data distributed near the requested data from the SDRAM, and stores therein the additionally read data. Thus, there is a higher chance that data that will be demanded after the request is also stored in the cache memory. (see Non-Patent Document 1)

The requested data and the additionally read data collectively form a block.

An SDRAM allows addresses of wraparound to enable data reading to be performed in units of a block.

Home audio-video equipments also include an LSI, which functions as a memory control unit. An LSI controls an SDRAM by means of data buses for transmitting data signals, address buses for transmitting address signals, and control buses for transmitting control signals (CLK, RAS, CAS, CS, WE, CKE, and DQM)

The number of data buses and the number of address buses respectively increase in proportion to the bits of data to be written/read to/from an SDRAM and the bits of an address.

Recent development of larger capacity memories causes the bits of data and the bits of an address to increase, thereby increasing the number of data buses and the number of address buses.

This poses the following problem. More buses requires more terminals in an LSI to transfer data and addresses, to increase the size of the package of an LSI. As a result, the manufacturing cost of an LSI is increased.

To solve the above-mentioned problem, an information processing apparatus in which an SDRAM is controlled by sharing a same bus which functions as a data bus, an address bus and the like has been developed. (see Patent Document 1)

However, the information processing apparatus sharing a same bus disclosed in JP2000-267985 can not make use of a wraparound function of an SDRAM. Accordingly, the information processing apparatus cannot perform information processing with maintaining consistency between data stored in a cache memory and data stored in an SDRAM.

In light of the above problem, the object of the present invention is to provide a useful information processing apparatus which has a memory control unit with a smaller number of terminals for signal input/output and in which information processing is performed with maintaining consistency between data stored in a cache memory and data stored in a memory unit.

Patent Document 1: unexamined Japanese patent application publication 2000-267985

Non-Patent Document 1: How Microprocessors Work (Irasuto de yomu microprocessor nyuumon), Gregg Wyant and Tucker Hammerstrom, Impress Corporation, 1995, pages 78–79

SUMMARY OF THE INVENTION

The present invention is an information processing apparatus comprising a memory unit that has a predetermined burst length and is operable to transfer block data, using a wraparound method, to/from a memory block that is constituted by a plurality of consecutive memory cells in the memory unit and has a length equal to the predetermined burst length, and a memory control unit that is connected to the memory unit by a bus used for both address transfer and data transfer, wherein the memory control unit includes an output subunit operable to output a first command and a second command, when the transfer of the block data to/from the memory block starts with transfer of data to/from an intermediate memory cell in the memory block, the intermediate memory cell being a memory cell other than an initial memory cell in the memory block, the first command instructing the memory unit to transfer data to/from each of the plurality of memory cells in the memory block, except for a memory cell directly before the intermediate memory cell, the second command being output when a predetermined time has elapsed since the output of the first command, and instructing the memory unit to transfer data to/from the memory cell directly before the intermediate memory cell in the memory block, and the memory unit transfers the block data in accordance with the first command and the second command.

According to this construction, the number of terminals for signal input/output in the memory control unit can be reduced, and information processing can be performed with maintaining consistency between data stored in a cache memory and data stored in the memory unit.

Here, the memory unit may be an SDRAM.

According to this construction, the number of terminals for signal input/output in the memory control unit can be reduced, and information processing can be performed with maintaining consistency between data stored in a cache memory and data stored in the SDRAM.

Here, the first command may include a writing instruction and an address indicating the memory cell directly before the intermediate memory cell, the second command may include a writing instruction and an address indicating a memory cell two memory cells before the intermediate memory cell.

According to this construction, the number of terminals for signal input/output in the memory control unit can be reduced, data is written into the memory unit in a wraparound method, and information processing can be performed with maintaining consistency between data stored in a cache memory and data stored in the memory unit.

Here, the first command may include a reading instruction and an address indicating the intermediate memory cell, the second command may include a reading instruction and an address indicating the memory cell directly before the intermediate memory cell.

According to this construction, the number of terminals for signal input/output in the memory control unit can be reduced, data is read from the memory unit in a wraparound method, and information processing can be performed with maintaining consistency between data stored in a cache memory and data stored in the memory unit.

Here, the present invention may be an information processing apparatus comprising a memory unit that has a burst length larger than a block length of a memory block and is operable to transfer block data to/from the memory block constituted by a plurality of consecutive memory cells in the memory unit, a memory control unit that is connected to the memory unit by a bus used for both address transfer and data transfer, a cache unit operable to request the memory control unit to transfer the block data to/from the memory unit, a writing unit operable to (i) receive, from the cache unit, an address indicating an intermediate memory cell in the memory block, the block data, and a writing request, the intermediate memory cell being a memory cell other than an initial memory cell in the memory block, and (ii) store data into each of the plurality of memory cells in the memory block in the memory unit in an order of from the initial memory cell to a final memory cell in the memory block, and a reading unit operable to (a) receive, from the cache unit, the address indicating the intermediate memory cell in the memory block, and a reading request, (b) read data from each of the plurality of memory cells in the memory block in the memory unit in an order of from the initial memory cell to the final memory cell, and (c) send the read data to the cache unit, using a wraparound method, starting with data read from the intermediate memory cell and ending with data read from a memory cell directly before the intermediate memory cell.

According to this construction, the number of terminals for signal input/output in the memory control unit can be reduced, and information processing can be performed with maintaining consistency between data stored in a cache memory and data stored in the memory unit.

Here, the memory unit may be an SDRAM, and the information processing apparatus may include a writing unit operable to (i) receive, from the cache unit, an address indicating an intermediate memory cell in the memory block, the block data, and a writing request, the intermediate memory cell being a memory cell other than an initial memory cell in the memory block, and (ii) store data into each of the plurality of memory cells in the memory block in the memory unit in an order of from the initial memory cell to a final memory cell in the memory block, and a reading unit operable to (a) receive, from the cache unit, the address indicating the intermediate memory cell in the memory block, and a reading request, (b) read data from each of the plurality of memory cells in the memory block in the memory unit in an order of from the initial memory cell to the final memory cell, and (c) send the read data to the cache unit, using a wraparound method, starting with data read from the intermediate memory cell and ending with data read from a memory cell directly before the intermediate memory cell.

According to this construction, the number of terminals for signal input/output in the memory control unit can be reduced, and information processing can be performed with maintaining consistency between data stored in a cache memory and data stored in the SDRAM.

Here, the present invention may be a memory operable to store data in accordance with signals input thereto, the signals including a control signal such as a clock, an address signal, and a data signal, the memory comprising a transmission unit operable to transmit the signals, a detection unit operable to detect an edge of the clock, a memory cell group that is constituted by a plurality of memory cells each of which has an assigned address, an address storing unit operable to (i) retrieve an address signal when the detection unit detects an edge of the clock at a predetermined timing, and (ii) store therein the retrieved address signal as a writing address, an address addition unit operable to increment the writing address, after an edge is detected subsequent to the detection of the edge at the predetermined timing, but before a next edge is detected, a data storing unit operable to retrieve a data signal every time the detection unit detects an edge of the clock, after the detection unit detects the edge at the predetermined timing, and a control unit operable to perform control so that, every time the data storing unit retrieves a data signal, the retrieved data signal is written into a memory cell indicated by the writing address stored in the address storing unit.

According to this construction, the memory control unit does not need to perform an address decrement operation, and the number of terminals for signal input/output in the memory control unit can be reduced.

Here, the transmission unit may include one signal input/output terminal for two of the address signal, the data signal, and the control signal, one of the two signals being input to the signal input/output terminal at a time, and a signal line which is connected to two units selected from (i) the address storing unit that stores the writing address indicating the memory cell to which the data signal is to be written, (ii) the data storing unit that stores the data signal that is to be written to the memory cell, and (iii) the control unit that controls the writing of the data signal, so as that the selected two units correspond to the two signals input to the signal input/output terminal.

According to this construction, the number of terminals for signal input/output in the memory control unit and the memory can be reduced, and information processing can be performed with maintaining consistency between data stored in a cache memory and data stored in the memory.

Here, the memory may be an SDRAM, and may include a transmission unit operable to transmit the signals, a detection unit operable to detect an edge of the clock, a memory cell group that is constituted by a plurality of memory cells each of which has an assigned address, an address storing unit operable to (i) retrieve an address signal when the detection unit detects an edge of the clock at a predetermined timing, and (ii) store therein the retrieved address signal as a writing address, an address addition unit operable to increment the writing address, after an edge is detected subsequent to the detection of the edge at the predetermined timing, but before a next edge is detected, a data storing unit operable to retrieve a data signal every time the detection unit detects an edge of the clock, after the detection unit detects the edge at the predetermined timing, and a control unit operable to perform control so that, every time the data storing unit retrieves a data signal, the retrieved data signal is written into a memory cell indicated by the writing address stored in the address storing unit.

According to this construction, the number of terminals for signal input/output in the memory control unit and the SDRAM can be reduced, and information processing can be performed with maintaining consistency between data stored in a cache memory and data stored in the SDRAM.

Here, the present invention may be an information processing method for transferring data to/from a memory by means of a bus used for both address transfer and data transfer, the memory operating in accordance with a command, having a predetermined burst length, and transferring block data, by using a wraparound method, to/from a memory block that is constituted by a plurality of memory cells in the memory and has a length equal to the predetermined burst length, the information processing method comprising a first output step of, when the transfer of the block data to/from the memory block starts with transfer of data to/from an intermediate memory cell in the memory block, the intermediate memory cell being a memory cell other than an initial memory cell in the memory block, outputting a first command to instruct the memory to transfer data to/from each of the plurality of memory cells in the memory block, except for a memory cell directly before the intermediate memory cell, and a second output step of, when a predetermined time has elapsed since the output of the first command, outputting a second command to instruct the memory to transfer data to/from the memory cell directly before the intermediate memory cell in the memory block.

According to this construction, the number of terminals for signal input/output can be reduced, and information processing can be performed with maintaining consistency between data stored in a cache memory and data stored in the memory.

Here, the present invention may be a program used in an information processing apparatus that transfers data to/from a memory by means of a bus used for both address transfer and data transfer, the memory operating in accordance with a command, having a predetermined burst length, and transfer block data, by using a wraparound method, to/from a memory block that is constituted by a plurality of memory cells in the memory and has a length equal to the predetermined burst length, the program comprising a first output step of, when the transfer of the block data to/from the memory block starts with transfer of data to/from an intermediate memory cell in the memory block, the intermediate memory cell being a memory cell other than an initial memory cell in the memory block, outputting a first command to instruct the memory to transfer data to/from each of the plurality of memory cells in the memory block, except for a memory cell directly before the intermediate memory cell, and a second output step of, when a predetermined time has elapsed since the output of the first command, outputting a second command to instruct the memory to transfer data to/from the memory cell directly before the intermediate memory cell in the memory block.

According to this construction, the number of terminals for signal input/output can be reduced, and information processing can be performed with maintaining consistency between data stored in a cache memory and data stored in the memory.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

1. First Embodiment 1.1 Construction

Figure 1:
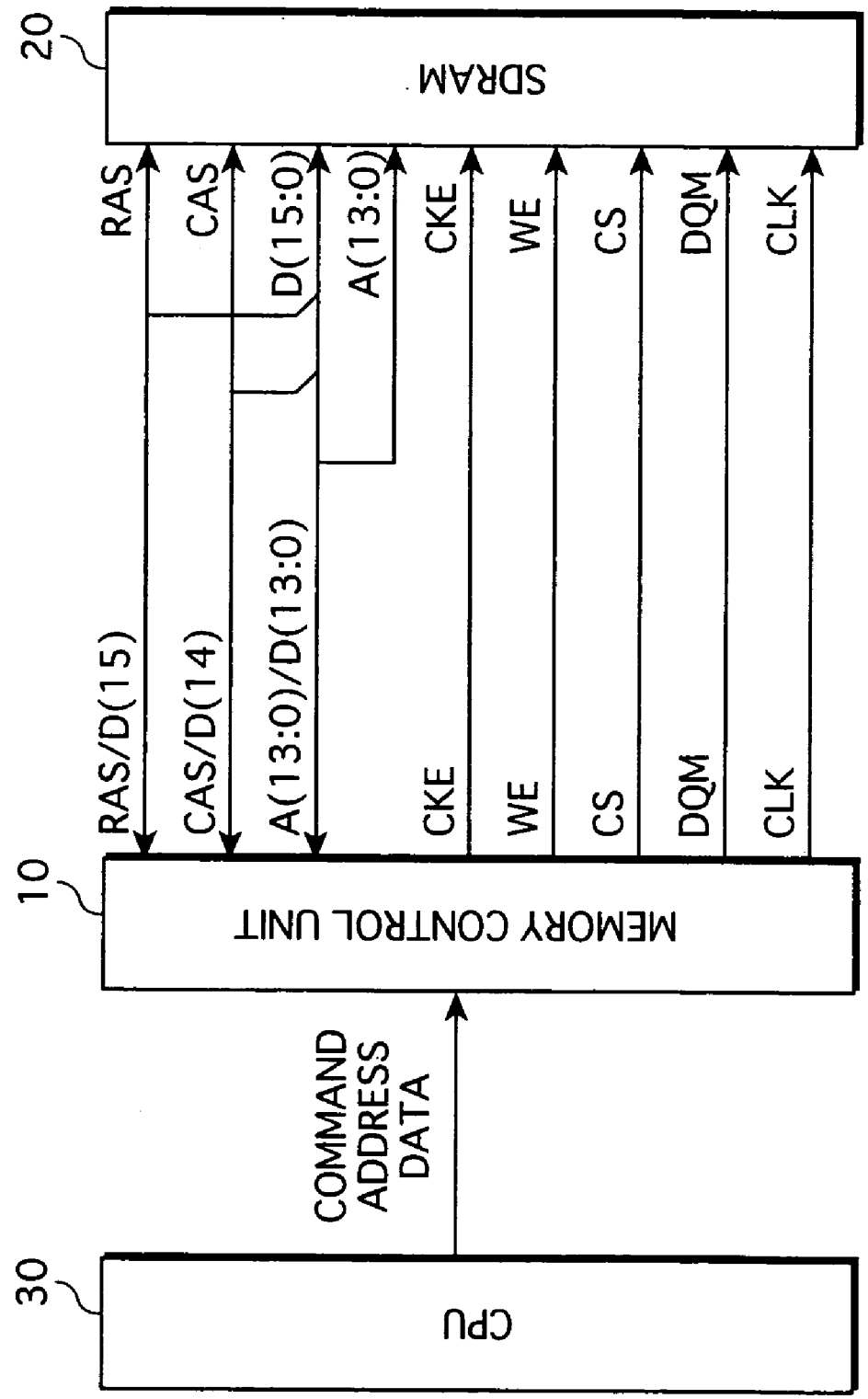
FIG. 1 illustrates a construction of an information processing apparatus of the present invention.

FIG. 1 shows a construction of an information processing apparatus 1 relating to a first embodiment of the present invention.

A memory control unit 10 is electrically connected to a CPU 30 by a bus.

Concretely speaking, the memory control unit 10 is an LSI to control an SDRAM 20.

As shown in FIG. 1, the memory control unit 10 is electrically connected to the SDRAM 20 by signal lines which transmits one or two kinds of signals selected from address signals, data signals and control signals.

The memory control unit 10 transmits/receives a 14-bit address to/from the SDRAM 20. Such a 14-bit address from A13 to A0 is shown as A(13:0) in FIG. 1.

Similarly, the memory control unit 10 transmits/receives 16-bit data to/from the SDRAM 20. Such 16-bit data from D15 to D0 is shown as D(13:0), D(14), and D(15).

The memory control unit 10 transmits/receives data to/from the SDRAM 20 in units of 16 bits, which is equivalent to one word.

Control signals include RAS, CAS, CKE, WE, CS, DQM and CLK. These signals are defined by the control specification of an SDRAM, and therefore not explained in detail.

The SDRAM 20 has a plurality of memory cells each of which stores data of one word.

Each memory cell is identified by a pair of a 14-bit row address and a 14-bit column address.

In the first embodiment, it is assumed that the memory control unit 10 writes/reads data to/from memory cells that have a row address of 0.

To generate commands defined by the SDRAM control specification, the memory control unit 10 holds RAS, CAS, CKE, WE, CS, DQM and CLK high or low, in synchronization with CLK, based on the control specification.

For example, the memory control unit 10 holds CS, CAS and WE low, and RAS high, to generate a write command that instructs the SDRAM 20 to perform a write operation.

According to the first embodiment, the memory control unit 10 uses an active command, a read command, a write command, and a burst stop command, which are defined by the SDRAM control specification, in order to control the SDRAM 20.

The CPU 30 requests the memory control unit 10 to perform data read and write operations in units of block data constituted by four words.

The memory control unit 10 requests the SDRAM 20 to transmit/receive data in units of block data constituted by four words, in accordance with an instruction from the CPU 30.

Figure 2:
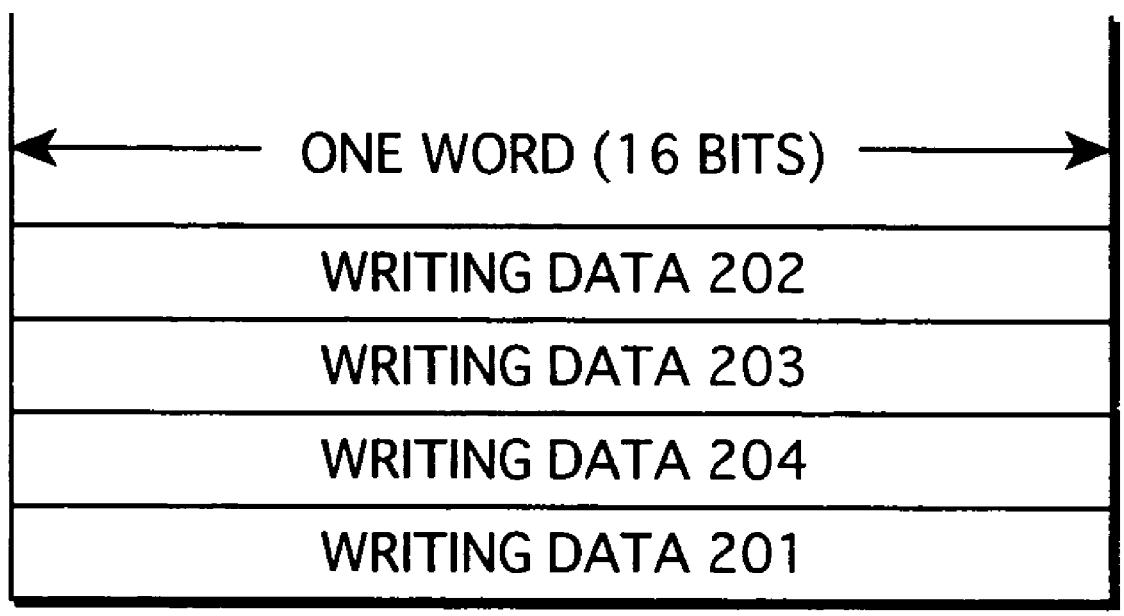
FIG. 2 illustrates a construction of writing data a memory control unit writes into an SDRAM in response to a request from a CPU.

FIG. 2 shows a construction of writing data which the memory control unit 10 writes into the SDRAM 20 in response to a request from the CPU 30.

Writing data is block data which includes writing data 202, writing data 203, writing data 204, and writing data 201. The writing data 202, 203, 204 and 201 are respectively equivalent to one word.

Figure 3:
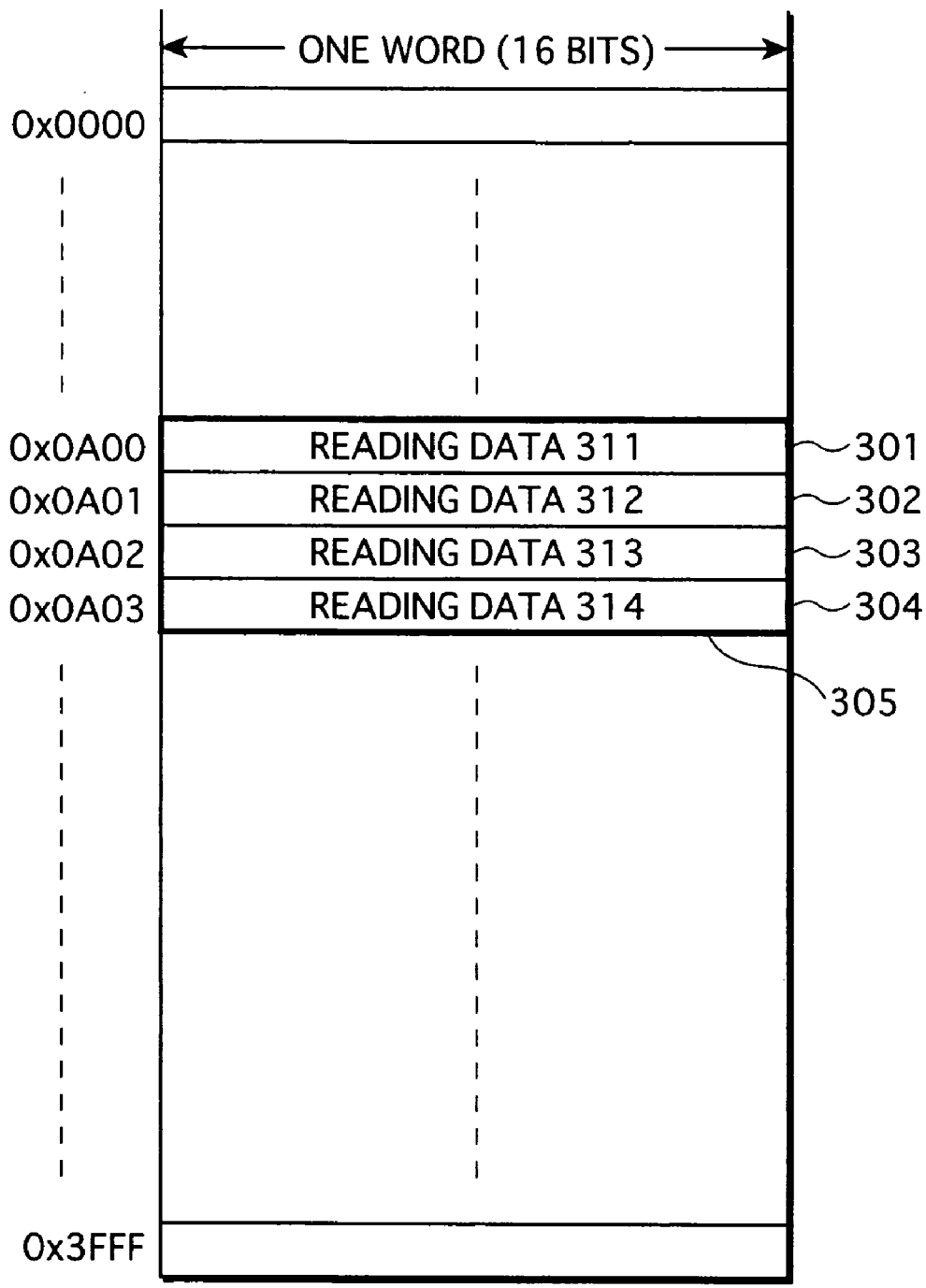
FIG. 3 illustrates a part of a memory area for storing data in the SDRAM.

FIG. 3 shows a part of a memory area in the SDRAM 20 for storing data.

Here, it is assumed that a row address of the memory area in FIG. 3 is zero.

A memory area is constituted by a plurality of memory cells each of which stores data of one word. Each memory cell has an assigned column address, which is one of 0x0000 to 0x3FFF.

A memory block 305 is constituted by memory cells 301 to 304. Column addresses from 0x0A00 to 0x0A03 are respectively allocated to the memory cells 301 to 304.

Here, the above numerical values starting with 0x are hexadecimal numerals. For example, 0x0A00 is 0A00 in hexadecimal.

In a memory block, a memory cell with the smallest column address and a memory cell with the largest column address are respectively called a block start cell and a block end cell.

An address for a block start cell is called a block start address, and an address for a block end cell is a block end address.

The smallest digit of a column address in hexadecimal of a block start address is divisible by four, such as 0x0A00 and 0x0A04.

In the memory block 305, the block start cell is the memory cell 301, and the block end cell is the memory cell 304.

It is assumed that the SDRAM 20 operates in a burst transfer mode and has a burst length set to four, which is equal to the number of words in a memory block.

The SDRAM 20 has a CAS Latency of 2.

The SDRAM 20 has a wraparound function, which enables data input/output to/from a block start cell is performed after data input/output to/from a block end cell.

For instance, the SDRAM 20 receives an active command and a row address from the memory control unit 10. Then, the SDRAM 20 receives a write command, a column address, which is the column address of the memory cell 302 here, and the writing data 202, the writing data 203, the writing data 204, and the writing data 201. Here, the SDRAM 20 writes the writing data 202 into the memory cell 302, the writing data 203 into the memory cell 303, the writing data 204 into the memory cell 304, i.e. the block end cell. After this, the SDRAM 20 writes the writing data 201 into the memory cell 301, i.e. the block start cell using a wraparound method.

1.1.1. Memory Control Unit 10

Figure 4:
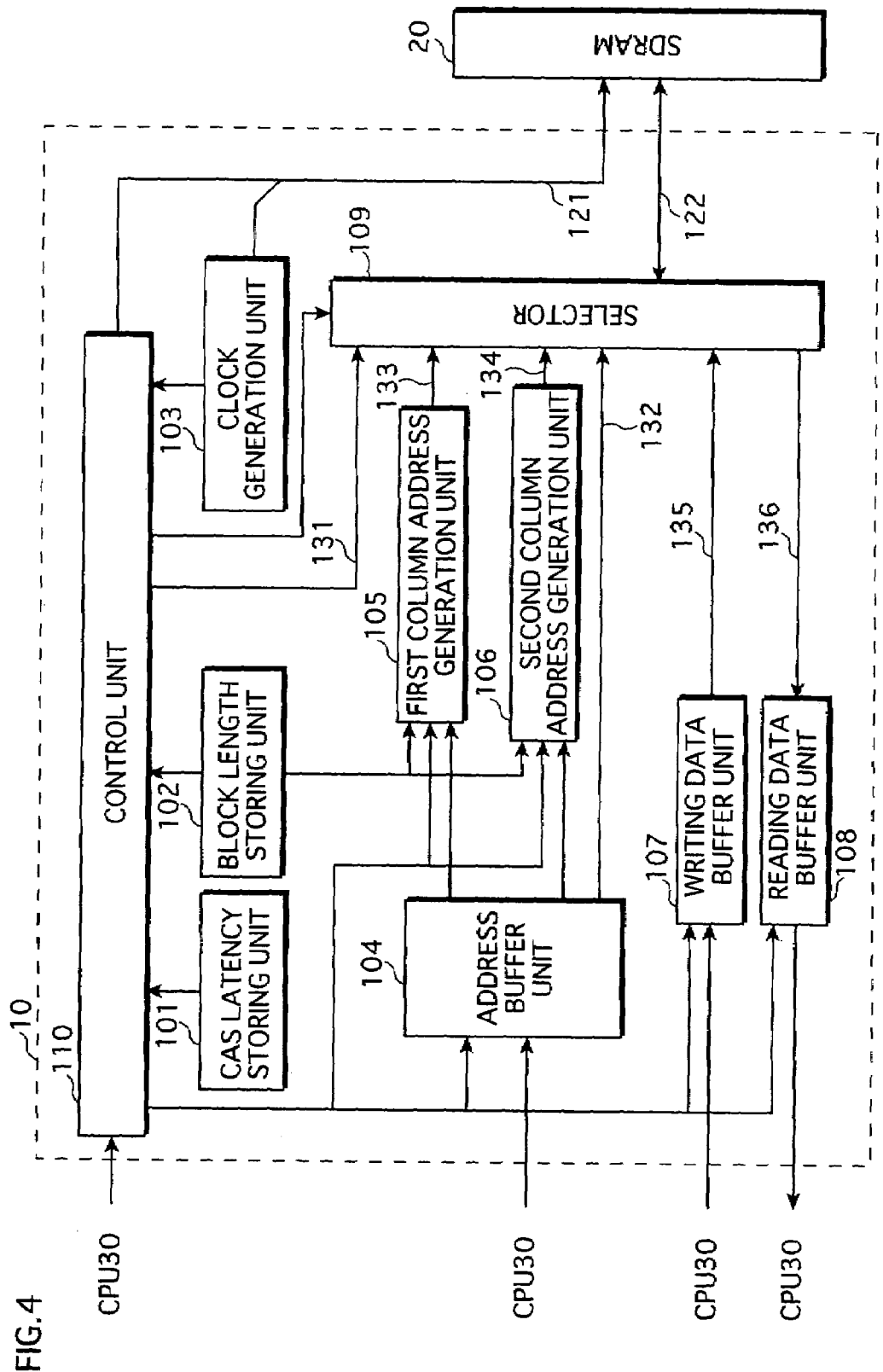
FIG. 4 is a block diagram illustrating a construction of the memory control unit.

FIG. 4 is a block diagram illustrating a construction of the memory control unit 10.

(CAS Latency Storing Unit 101)

A CAS Latency storing unit 101 prestores CAS Latency relating to the specification of the SDRAM 20.

The CAS Latency storing unit 101 stores a numerical value of 2 as CAS Latency of the SDRAM 20.

(Block Length Storing Unit 102)

A block length storing unit 102 prestores a burst length defined in the SDRAM 20, as a block length.

The block length storing unit 102 stores a numerical value of 4, which is a burst length defined by the SDRAM 20, as a block length.

(Clock Generation Unit 103)

A clock generation unit 103 generates a clock signal to be supplied to the SDRAM 20.

The SDRAM 20 examines whether an input signal is held high or low on the rising edge of a clock signal, and performs an operation corresponding to the result of the examination.

(Address Buffer Unit 104)

An address buffer unit 104 receives a start row address and a start column address from the CPU 30, and stores them therein. A start row address and a start column addresses are a pair of a row address and a column address indicating a memory cell from which data input/output starts.

The address buffer unit 104 sends a start column address to a first column address generation unit 105 and a second column address generation unit 106.

(First Column Address Generation Unit 105)

If a start column address received from the address buffer unit 104 is a block start address, the first column address generation unit 105 sets a block end address as a first column address. If not, the first column address generation unit 105 subtracts one from a start column address received from the address buffer unit 104, and sets the result address of the subtraction as a first column address.

(Second Column Address Generation Unit 106)

If a first column address is a block start address, the second column address generation unit 106 sets a block end address as a second column address. If not, the second column address generation unit 106 subtracts one from a first column address, and set the result address of the subtraction as a second column address.

(Writing Data Buffer Unit 107)

A writing data buffer unit 107 stores writing data received from the CPU 30.

(Reading Data Buffer Unit 108)

A reading data buffer unit 108 stores reading data received from the SDRAM 20.

(Selector 109)

A selector 109 selects a signal group to be output, out of a plurality of signal groups that are input thereto, in accordance with a selection instruction received from a control unit 110 (mentioned later).

A selection instruction is expressed by a value selected from 1 to 5.

Receiving a selection instruction of 1, the selector 109 connects a bus 131 and a bus 132 with a bus 122. The bus 122 is composed of 16 signal lines, the bus 131 of two signal lines, and the bus 132 of 14 signal lines.

Receiving a selection instruction of 2, the selector 109 connects the bus 131 and a bus 133 with the bus 122.

Receiving a selection instruction of 3, the selector 109 connects the bus 131 and a bus 134 with the bus 122.

Receiving a selection instruction of 4, the selector 109 connects a bus 135 with the bus 122.

Receiving a selection instruction of 5, the selector 109 connects a bus 136 with the bus 122.

(Control Unit 110)

The control unit 110 receives a writing request or a reading request from the CPU 30. A writing request instructs data input to the SDRAM 20, and a reading request instructs data output from the SDRAM 20.

The control unit 110 reads/writes data from/to the SDRAM 20, according to a request received from the CPU 30.

The control unit 110 generates an active command, a write command, a read command, and a burst stop command, using control signals, to send the commands to the SDRAM 20.

In addition, the control unit 110 sends a selection instruction to the selector 109 so as that a signal group to be transmitted through the bus 122 is selected.

(Bus 121)

A bus 121 is a signal line group composed of five signal lines to transmit signals of CS, WE, CKE, DQM and CLK respectively.

(Bus 122)

The bus 122 is composed of 16 signal lines.

(Bus 131)

The bus 131 is a signal line group composed of two signal lines to transmit signals of RAS and CAS respectively.

(Bus 132)

The bus 132 is a signal line group composed of 14 signal lines to transmit, in parallel, one of a 14-bit row address and a 14-bit column address output from the address buffer unit 104.

(Bus 133)

The bus 133 is a signal line group composed of 14 signal lines to transmit, in parallel, a 14-bit first column address output from the first column address generation unit 105.

(Bus 134)

The bus 134 is a signal line group composed of 14 signal lines to transmit, in parallel, a 14-bit second column address output from the second column address generation unit 106.

(Bus 135)

The bus 135 is a signal line group composed of 16 signal lines to transmit, in parallel, 16-bit writing data output from the writing data buffer unit 107.

(Bus 136)

The bus 136 is a signal line group composed of 16 signal lines to transmit, in parallel, 16-bit reading data output from the SDRAM 20 to the reading data buffer unit 108.

1.2. Operation 1.2.1. Read Operation

Figure 5:
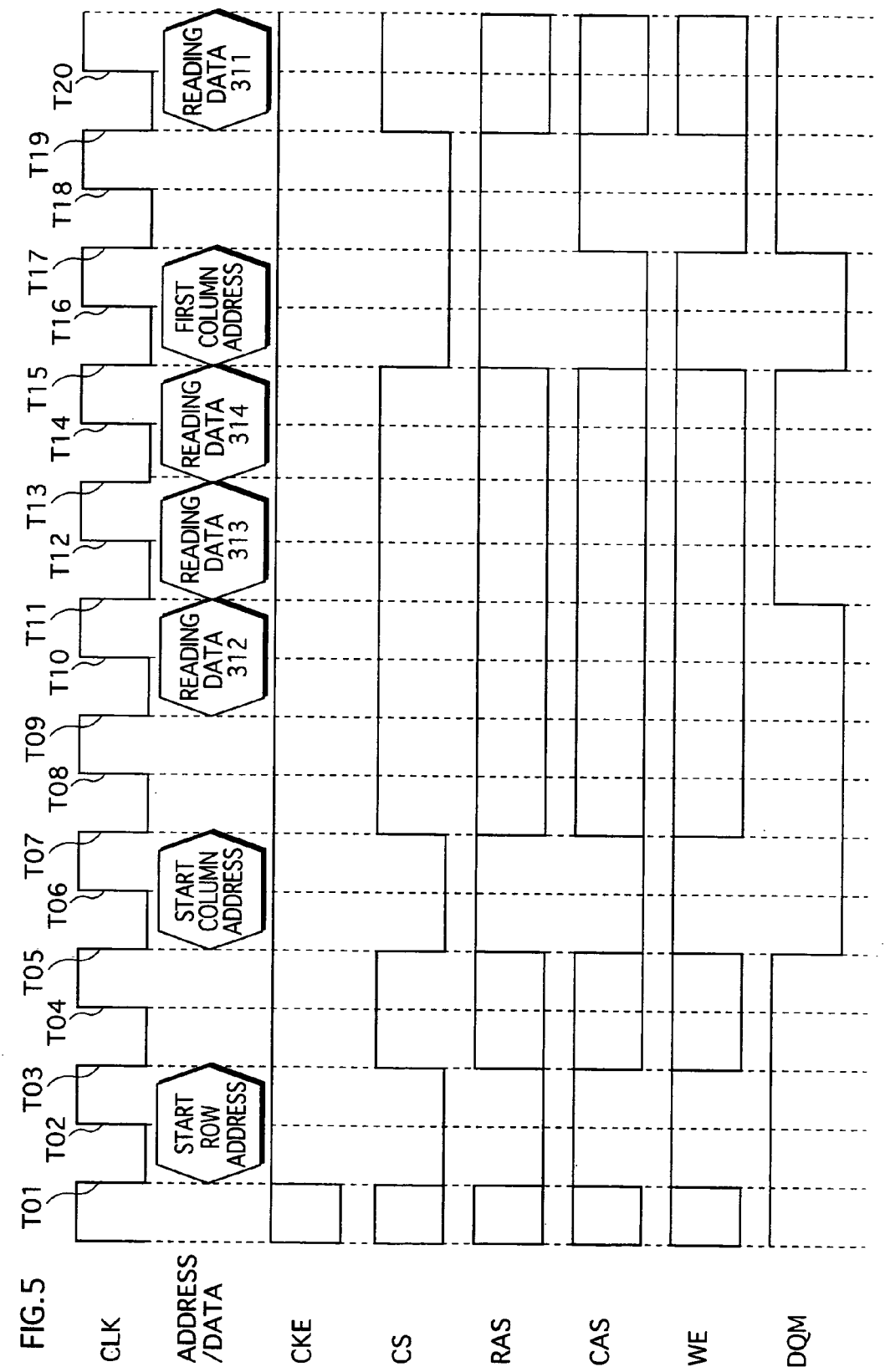
FIG. 5 is a timing diagram for signals transmitted between the memory control unit and the SDRAM when the memory control unit reads data from the SDRAM.

FIG. 5 is a timing diagram for signals transmitted between the memory control unit 10 and the SDRAM 20 when the memory control unit 10 reads data from the SDRAM 20.

In FIG. 5, reference marks T01 to T20 each indicate the timing at which a rising edge or a falling edge of CLK is generated.

(Before T01)

The CPU 30 outputs a reading request, and a start row address and a start column address for identifying a memory cell from which data reading starts, to the memory control unit 10.

Here, it is assumed that a start row address of 0 and a start column address of 0x0A01 are input to the memory control unit 10.

The control unit 110 receives the reading request from the CPU 30.

The address buffer unit 104 receives and stores therein the start row address and the start column address.

The address buffer unit 104 sends the start column address to the first column address generation unit 105 and the second column address generation unit 106.

The first column address generation unit 105 generates a first column address of 0x0A00 based on the received start column address of 0x0A01.

The second column address generation unit 106 generates a second column address of 0x0A03 based on the received start column address of 0x0A01.

Here, the second column address generation unit 105 may not generate a second column address to perform a reading operation, as the memory control unit 10 does not require a second column address to read data from the SDRAM 20.

(T01, Between T01 and T02)

The control unit 110 sends a selection instruction of 1 to the selector 109.

The selector 109 connects the buses 131 and 132 with the bus 122 in accordance with the selection instruction.

The address buffer unit 104 outputs the start row address to the bus 132 in accordance with an instruction from the control unit 110.

The control unit 110 holds CKE and DQM high.

The control unit 110 holds CAS and WE high, and CS and RAS low, to generate an active command.

(T02, Between T02 and T03)

At the time T02, the SDRAM 20 receives the active command and the start row address.

(T03, Between T03 and T05)

At the time T03, the control unit 110 holds CS high.

(T05, Between T05 and T06)

The address buffer unit 104 outputs the start column address to the bus 132 in accordance with an instruction from the control unit 110.

At the time T05, the control unit 110 holds DQM low.

At the time T05, the control unit 110 holds CS and CAS low, and RAS and WE high, to generate a read command.

(T06, Between T06 and T07)

At the time T06, the SDRAM 20 receives the read command and the start column address.

(T07)

The control unit 110 holds CS and CAS high.

(Between T07 and T09, T09)
The control unit 110 sends a selection instruction of 5 to the selector 109.
The selector 109 connects the bus 136 with the bus 122 in accordance with the selection instruction.

(Between T09 and T11)
The SDRAM 20 outputs reading data 312 stored in the memory cell 302, which is identified by the start column address, to the bus 122.
The reading data buffer unit 108 receives the reading data 312, and sends it to the CPU 30.

(T11)
The control unit 110 holds DQM high.

(Between T11 and T13)
The SDRAM 20 outputs reading data 313 stored in the memory cell 303, to the bus 122.
At the time T12, the reading data buffer unit 108 receives the reading data 313, and sends it to the CPU 30.
As DQM is held high at the time T12, the SDRAM 20 judges that it does not need to output data after the time T16. This is because CAS Latency is 2 and the time T16 corresponds to the second rising edge of the clock signal after the time T12.

(T13, between t13 and t15)
The SDRAM 20 outputs reading data 314 stored in the memory cell 304 to the bus 122.
At the time T14, the reading data buffer unit 108 receives the reading data 314, and sends it to the CPU 30.

(T15, Between T15 and T16)
The control unit 110 sends a selection instruction of 2 to the selector 109.
The selector 109 connects the buses 131 and 133 with the bus 122.
The control unit 110 holds DQM low.
The control unit 110 holds CS and CAS low, and RAS and WE high, to generate a read command.
The first column address generation unit 105 outputs the first column address to the bus 133 in accordance with an instruction from the control unit 110.

(T16, Between T16 and T17)
At the time T16, the SDRAM 20 receives the read command and the first column address.
As DQM is held low at the time T16, the SDRAM 20 judges that it needs to output data after the time T20. This is because CAS Latency is 2 and the time T20 corresponds to the second rising edge of the clock signal after the time T16.

(T17)
The control unit 110 holds DQM high.
The control unit 110 holds CS and WE low, and RAS and CAS high, to generate a burst stop command.

(Between T17 and T19)
At the time T18, the SDRAM 20 receives the burst stop command.
The control unit 110 maintains control signals as they are.
The control unit 110 sends a selection instruction of 5 to the selector 109.
The selector 109 connects the bus 136 with the bus 122.

(T19, Between T19 and T20, T20)
The SDRAM 20 outputs, to the bus 122, reading data 311 stored in the memory cell 301, which has been selected using a wraparound method.

At the time T20, the reading data buffer unit 108 receives the reading data 311, and sends it to the CPU 30.

1.2.2. Write Operation

Figure 6:
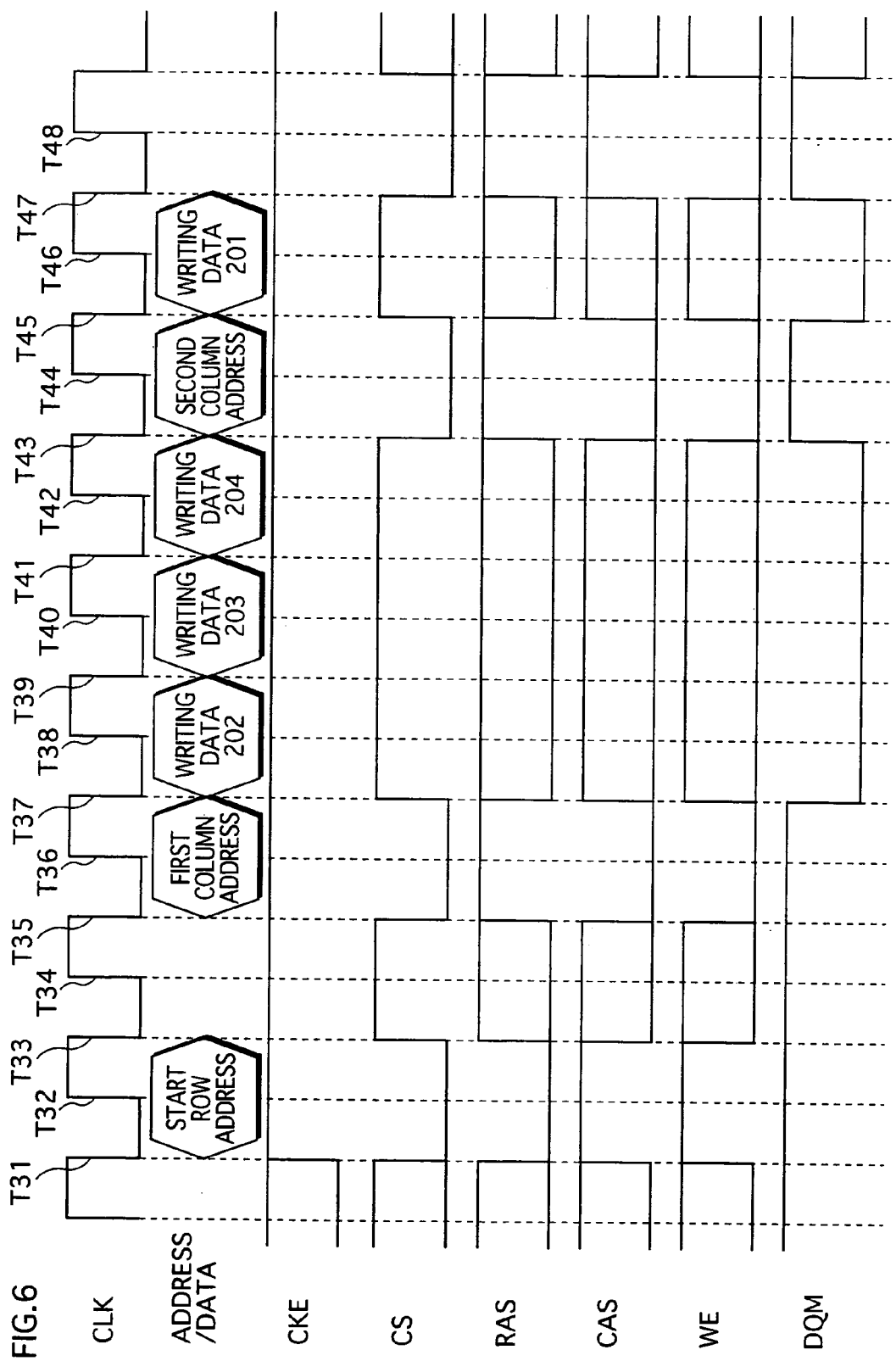
FIG. 6 is a timing diagram for signals transmitted between the memory control unit and the SDRAM when the memory control unit writes data into the SDRAM.

FIG. 6 is a timing diagram for signals transmitted between the memory control unit 10 and the SDRAM 20 when the memory control unit 10 writes data into the SDRAM 20.

(Before T31)
The CPU 30 sends a writing request, a start row address and a start column address for identifying a memory cell from which data writing starts, and the writing data 202, 203, 204, and 201, which is to be written into the SDRAM 20, to the memory control unit 10.
Here, it is assumed that a start row address of 0 and a start column address of 0x0A01 are input to the memory control unit 10.
The control unit 110 receives the writing request from the CPU 30.
The address buffer unit 104 receives and stores therein the start row address and the start column address.
The address buffer unit 104 sends the start column address to the first column address generation unit 105 and the second column address generation unit 106.
The first column address generation unit 105 generates a first column address of 0x0A00 based on the received start column address.
The second column address generation unit 106 generates a second column address of 0x0A03 based on the received start column address.

(T31, Between T31 and T32)
The control unit 110 sends a selection instruction of 1 to the selector 109.
The selector 109 receives the selection instruction, and connects the buses 131 and 132 with the bus 122.
The address buffer unit 104 outputs the start row address to the bus 132 in accordance with an instruction from the control unit 110.
The control unit 110 holds CKE and DQM high.
The control unit 110 holds CAS and WE high, and CS and RAS low, to generate an active command.

(T32, Between T32 and T33)
At the time T32, the SDRAM 20 receives the active command.

(T33)
The control unit 110 holds CS high.

(Between T33 and T35)
The control unit 110 sends a selection instruction of 2 to the selector 109.
The selector 109 connects the buses 131 and 133 with the bus 122.

(T35, Between T35 and T36)
The first column address generation unit 105 outputs the first column address to the bus 133 in response to an instruction from the control unit 110.
At the time T35, the control unit 110 holds DQM high.
At the time T35, the control unit 110 holds CS, CAS and WE low, and RAS high, to generate a write command.

(T36, Between T36 and T37)
At the time T36, the SDRAM 20 receives the write command and the first column address.
As DQM is held high at the time T36, the SDRAM 20 judges that signals D(15:0) are invalid. Therefore, the SDRAM 20 does not write data into the memory cell 301, which is indicated by the first column address.

Between the time T36 and the time T37, the control unit 110 sends a selection instruction of 4 to the selector 109.

The selector 109 connects the bus 135 with the bus 122.

(T37)

The control unit 110 holds CS and CAS high.

The control unit 110 holds DQM low.

(Between T37 and T39)

The writing data buffer unit 107 outputs the writing data 202 to the bus 135 in accordance with an instruction from the control unit 110.

At the time T38, the SDRAM 20 writes the writing data 202 into the memory cell 302, which has an address next to that of the memory cell 301.

(T39, Between T39 and T41)

The writing data buffer unit 107 outputs the writing data 203 to the bus 135 in accordance with an instruction from the control unit 110.

At the time T40, the SDRAM 20 writes the writing data 203 into the memory cell 303, which has an address next to that of the memory cell 302.

(T41, Between T41 and T43)

The writing data buffer unit 107 sends the writing data 204 to the bus 135 in accordance with an instruction from the control unit 110.

At the time T42, the SDRAM 20 writes the writing data 204 into the memory cell 304 which has an address next to that of the memory cell 303.

(T43)

The control unit holds DQM high.

The control unit 110 holds CS, CAS and WE low, and RAS and high, to generate a write command.

(Between T43 and T44)

The control unit 110 sends a selection instruction of 3 to the selector 109.

The selector 109 connects the buses 131 and 134 with the bus 122.

The second column address generation unit 106 outputs the second column address to the bus 134 in accordance with an instruction from the control unit 110.

(T44, Between T44 and T45)

At the time T44, the SDRAM 20 receives the write command and the second column address.

As DQM is held high at the time T44, the SDRAM 20 does not write data into the memory cell 304 which is identified by the second column address.

(T45)

The control unit 110 holds CS high.

The control unit 110 holds DQM low.

(Between T45 and T46)

The control unit 110 sends a selection instruction of 4 to the selector 109.

The selector 109 connects the bus 135 with the bus 122.

The writing data buffer unit 107 outputs the writing data 201 to the bus 135 in accordance with an instruction from the control unit 110.

(T46, Between T46 and T47)

At the time T46, the SDRAM 20 writes the writing data 201 into the memory cell 301. The address of the memory cell 301 is next to that of the memory cell 304 in a wraparound method.

(T47)

The control unit 110 holds DQM high.

The control unit 110 holds CS and WE low, and RAS and CAS high, to generate a burst stop command.

(Between T47 and T48, T48)

At the time T48, the SDRAM 20 receives the burst stop command.

2. Second Embodiment

2.1. Construction

An information processing apparatus 2 relating to a second embodiment is the same as the information processing apparatus 1 except for a memory control unit 50, which replaces the memory control unit 10 shown in FIG. 1.

The CPU 30 sends the same data writing and reading requests to the memory control unit 50 as the data writing and reading requests sent from the CPU 30 to the memory control unit 10 in the first embodiment.

A burst length for the SDRAM 20 is set to a value equal to the smallest possible length which allows writing and reading of data having a size equal to (a block length+1).

The SDRAM 20 defines a burst length of 2, 4 or 8, which is the n-th power of 2.

As a block length is set to four, a burst length in the SDRAM 20 is set to eight in the second embodiment.

2.1.1. Memory Control Unit 50

Figure 7:
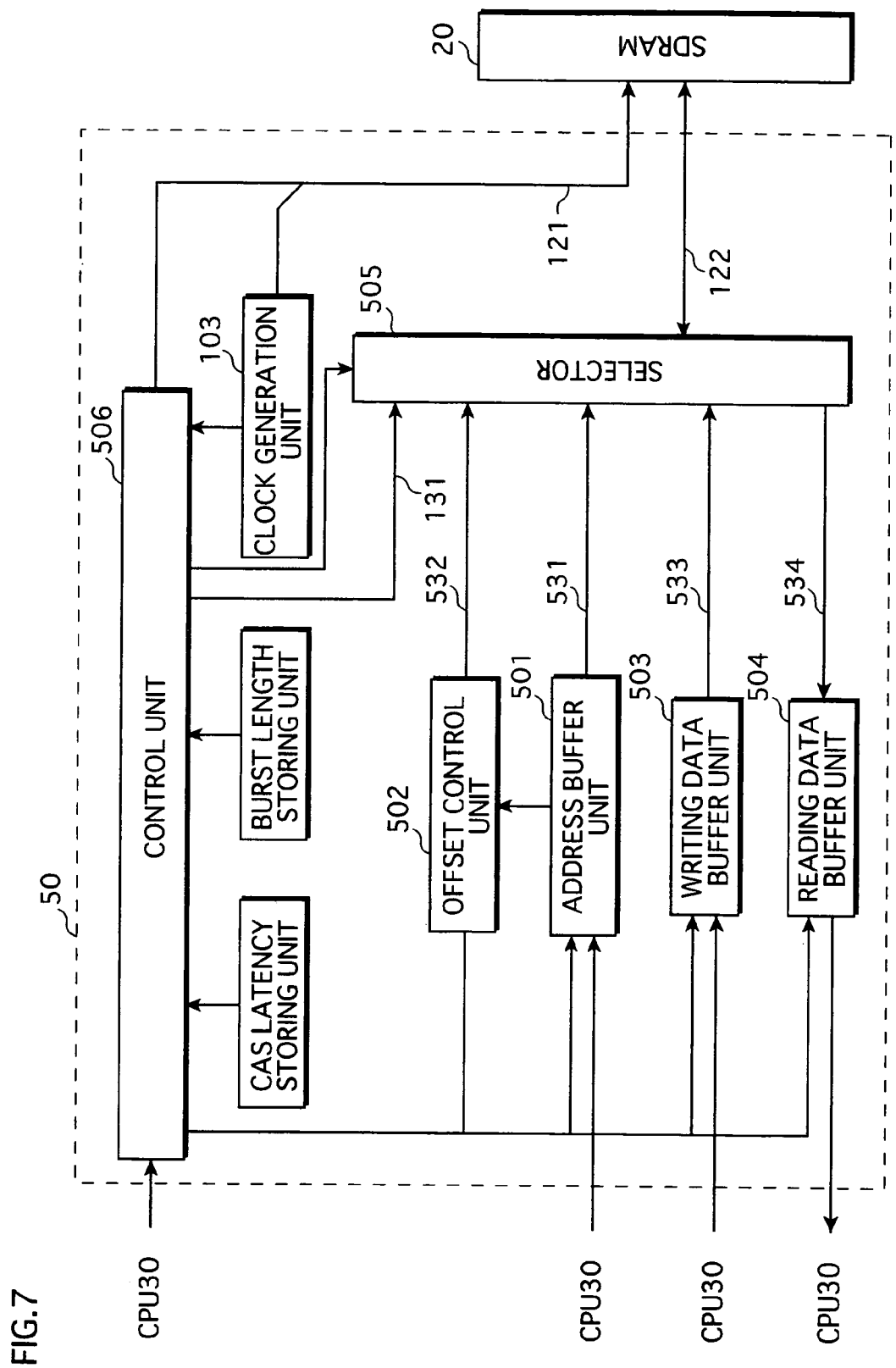
FIG. 7 illustrates a construction of a memory control unit.

FIG. 7 shows a construction of the memory control unit 50.

(Address Buffer Unit 501)

An address buffer unit 501 receives a start row address and a start column address from the CPU 30, and stores them. A pair of a start row address and a start column address indicate a memory cell from which data input/output starts.

The address buffer unit 501 sends a start column address to an offset control unit 502 (described later).

(Offset Control Unit 502)

The offset control unit 502 receives a start column address from the address buffer unit 501.

The offset control unit 502 generates either a writing column address or a reading column address based on a start column address from the address buffer unit 501.

More specifically, when the CPU 30 sends a writing request to the memory control unit 50, the offset control unit 502 selects a block end address of a memory block to which a memory cell indicated by a start column address belongs, as a writing column address.

When the CPU 30 sends a reading request to the memory control unit 50, the offset control unit 502 selects a block start address of the memory block as a reading column address.

The offset control unit 502 calculates an offset value, which is a difference between a start column address and a block start address.

The calculation of an offset value is explained with reference to the memory block 305 in FIG. 3. If a start column address is 0x0A01, a block start address is 0x0A00, which is the column address of the memory cell 301. Accordingly, an offset value is 1.

(Writing Data Buffer Unit 503)

A writing data buffer unit 503 stores therein writing data input from the CPU 30.

When sending a data writing request, the CPU 30 sends the writing data 202, the writing data 203, the writing data 204, and the writing data 201 to the writing data buffer unit 503 in the stated order.

The writing data buffer unit 503 outputs the writing data 201, the writing data 202, the writing data 203, and the writing data 204 in this order to the SDRAM 20 through a bus 533 (mentioned later), in response to an instruction from a control unit 506 (mentioned later). Here, the writing data 201 corresponds to a block start address.

(Reading Data Buffer Unit 504)

A reading data buffer unit 504 stores therein reading data input from the SDRAM 20.

The SDRAM 20 outputs the reading data 311, the reading data 312, the reading data 313, and the reading data 314, in the stated order, to the reading data buffer unit 504.

The reading data buffer unit 504 receives the reading data 311, the reading data 312, the reading data 313, and the reading data 314, in this order, from the SDRAM 20.

The reading data buffer unit 504 does not output the reading data 311 to 314 one by one to the CPU 30 immediately after receiving each of them from the SDRAM 20. Instead, the reading data buffer unit 504 outputs the reading data 311 to 314 from the SDRAM 20 to the CPU 30 only after it receives all of the reading data 311 to 314 corresponding to one block.

If the reading data buffer unit 504 receives reading data 311 to 314 corresponding to one block from the SDRAM 20, it outputs the reading data 311 to 314 in response to an instruction from the control unit 506 in the following manner 0. A start column address is regenerated by adding an offset value to a block start address. Then, the reading data buffer unit 504 first outputs, to the bus 533, the reading data 312 corresponding to the start column address, then in the order of the reading data 313, the reading data 314, and the reading data 311.

(Selector 505)

A selector 505 selects a signal group to be output, out of a plurality of signal groups input thereto, based on a selection instruction received from the control unit 506.

A selection instruction is one of the values from 1 to 4.

Receiving a selection instruction of 1, the selector 505 connects the bus 131 and a bus 531 with the bus 122. The bus 131 is composed of two signal lines, the bus 531 of 14 signal lines, and the bus 122 of 16 signal lines.

Receiving a selection instruction of 2, the selector 505 connects the bus 131 and a bus 532 with the bus 122. The bus 131 is composed of two signal lines, the bus 532 of 14 signal lines, and the bus 122 of 16 signal lines.

Receiving a selection instruction of 3, the selector 505 connects the bus 533 with the bus 122.

Receiving a selection instruction of 4, the selector 505 connects a bus 534 with the bus 122.

(Control Unit 506)

The control unit 506 receives, from the CPU 30, a writing request to input data into the SDRAM 20 and a reading request to obtain data from the SDRAM 20.

The control unit 506 writes/reads data to/from the SDRAM 20, based on a request received from the CPU 30.

The control unit 506 generates an active command, a write command, a read command, and a burst stop command using control signals, and sends them to the SDRAM 20.

Such active, write, read, and burst stop commands are defined by the control specifications of the SDRAM 20.

The control unit 506 sends a selection instruction to the selector 505 so as to select a signal group to be transmitted through the bus 122.

When writing data into the SDRAM 20, the control unit 506 requires the writing data buffer unit 503 to send writing data to the SDRAM 20, starting from data that should be written into a start memory cell of a block.

When reading data from the SDRAM 20, the control unit 506 requires the reading data buffer unit 504 to send reading data to the CPU 30, starting with data corresponding to a start column address.

(Bus 531)

The bus 531 is a signal line group composed of 14 signal lines to transmit, in parallel, a 14-bit block end address output from the address buffer unit 501.

(Bus 532)

The bus 532 is a signal line group composed of 14 signal lines to transmit, in parallel, a 14-bit block start address output from the offset control unit 502.

(Bus 533)

The bus 533 is a signal line group composed of 16 signal lines to transmit, in parallel, 16-bit writing data output from the writing data buffer unit 503.

(Bus 534)

The bus 534 is a signal line group composed of 16 signal lines to transmit, in parallel, 16-bit reading data received from the SDRAM 20 to the reading data buffer unit 504.

2.2. Operation 2.2.1. Read Operation

Figure 8:
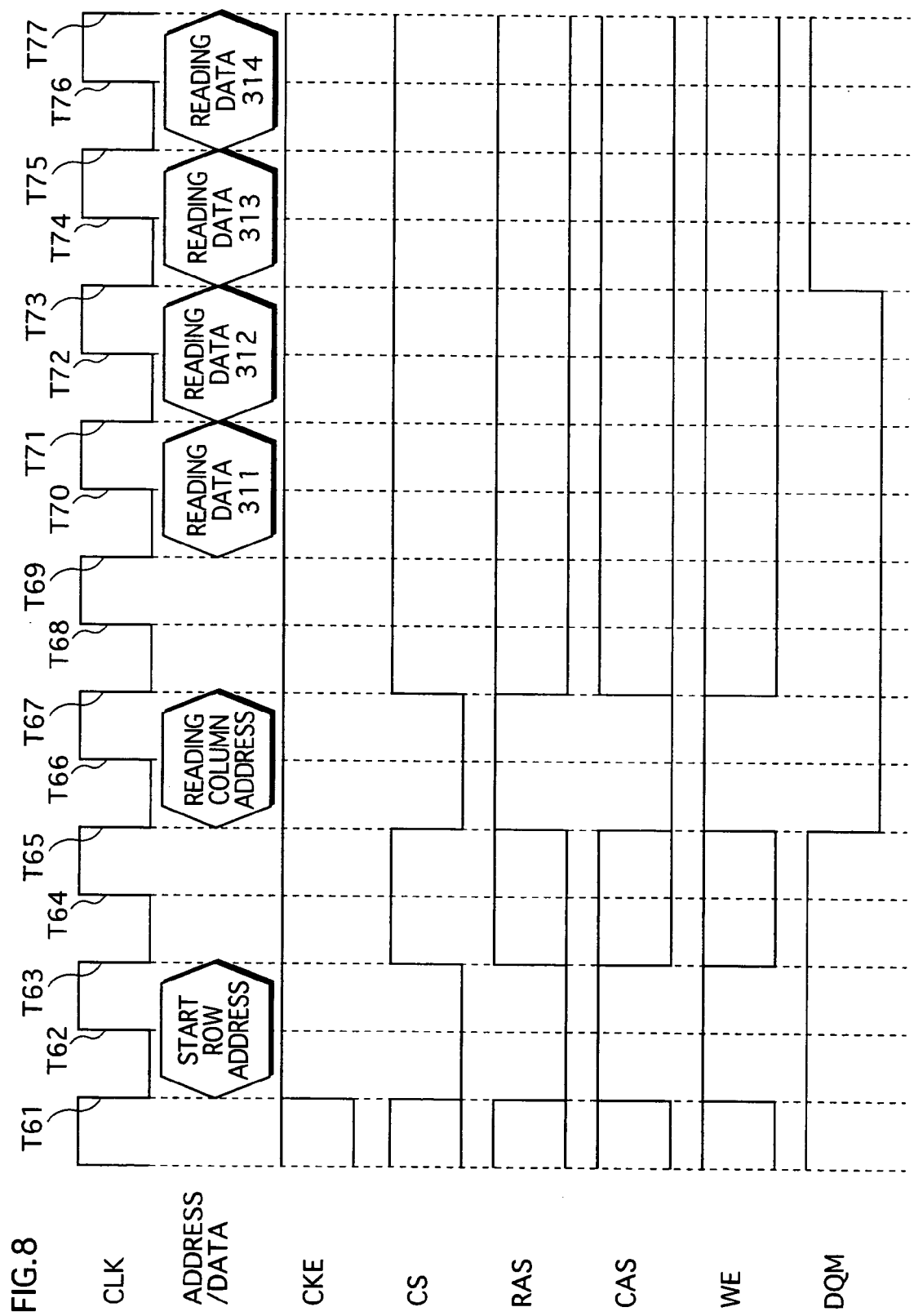
FIG. 8 is a timing diagram for signals transmitted between the memory control unit and the SDRAM when the memory control unit reads data from the SDRAM.

FIG. 8 is a timing diagram for signals transmitted between the memory control unit 50 and the SDRAM 20 when the memory control unit 50 reads data from the SDRAM 20.

(Before T61)

The CPU 30 sends a reading request, and a start row address and a start column address indicating a memory cell from which data reading starts, to the memory control unit 50.

Here, it is assumed that a start row address of 0 and a start column address of 0x0A01 are input.

The control unit 506 receives the reading request from the CPU 30.

The address buffer unit 501 receives and stores therein the start row address and the start column address.

The address buffer unit 501 sends the start column address to the offset control unit 502.

The offset control unit 502 generates a reading column address based on the received start column address.

Here, the reading column address is 0x0A00.

The offset value generated by the offset control unit 502 is 1.

(T61, Between T61 and T62)

The control unit 506 sends a selection instruction of 1 to the selector 505.

The selector 505 receives the selection instruction, and connects the buses 131 and 531 with the bus 122.

The address buffer unit 501 outputs a reading row address to the bus 531 in response to an instruction from the control unit 506.

The control unit 506 holds CKE and DQM high.

The control unit 506 holds CAS and WE high, and CS and RAS low, to generate an active command.

(T62, Between T62 and T63)

At the time T62, the SDRAM 20 receives the active command and the reading row address.

(T63, Between T63 and T65)

At the time T63, the control unit 506 holds CS high.

(T65, Between T65 and T66)

The control unit 506 sends a selection instruction of 2 to the selector 505.

The selector 505 receives the selection instruction, and connects the buses 131 and 532 with the bus 122.

The offset control unit 502 outputs the reading column address to the bus 532 in response to an instruction from the control unit 506.

The control unit 506 holds DQM low.

The control unit 506 holds CS and CAS low, and RAS and WE high, to generate a read command.

(T66, Between T66 and T67)

At the time T66, the SDRAM 20 receives the read command and the reading column address.

The control unit 506 maintains control signals as they are.

(T67)

The control unit 506 holds CS and CAS high.

(Between T67 and T69, T69)

The control unit 506 sends a selection instruction of 4 to the selector 505.

The selector 505 connects the bus 534 with the bus 122.

(Between T69 and T71)

The SDRAM 20 outputs the reading data 311 stored in the memory cell 301 indicated by the reading column address, to the bus 122.

At the time T70, the reading data buffer unit 504 receives and stores therein the reading data 311.

(T71, Between T71 and T73)

The SDRAM 20 outputs the reading data 312 stored in the memory cell 302 to the bus 122.

At the time T72, the reading data buffer unit 504 receives and stores therein the reading data 312.

(T73)

The control unit 506 holds DQM high.

(Between T73 and T75)

The SDRAM 20 outputs the reading data 313 stored in the memory cell 303 to the bus 122.

At the time T74, the reading data buffer unit 504 receives the reading data 313.

(T75, Between T75 and T77)

The SDRAM 20 outputs the reading data 314 stored in the memory cell 304 to the bus 122.

At the time T76, the reading data buffer unit 504 receives the reading data 314.

(T77, after T77)

The reading data buffer unit 504 first outputs the reading data 312 to the CPU 30, as the reading data 312 has been read from the memory cell 302 which is indicated by an address gained by adding the offset value to a block start address. After this, the reading data buffer unit 504 outputs the reading data 313, the reading data 314, and the reading data 311 to the CPU 30 in the stated order.

The control unit 506 generates a burst stop command.

The memory control unit 50 ignores reading data output from the SDRAM 20 after the time T77.

2.2.2. Write Operation

Figure 9:
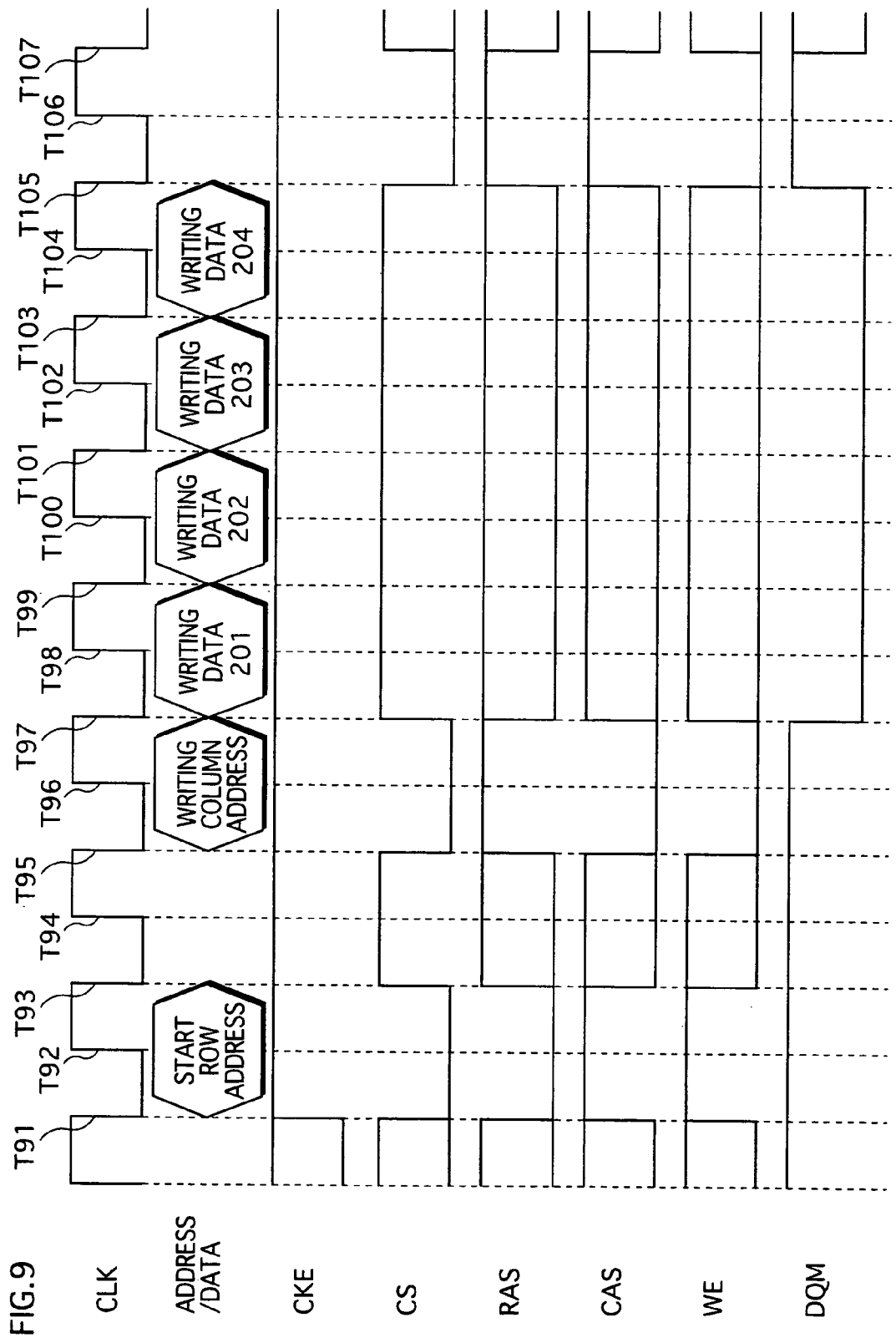
FIG. 9 is a timing diagram for signals transmitted between the memory control unit and the SDRAM when the memory control unit writes data into the SDRAM.

FIG. 9 is a timing diagram for signals transmitted between the memory control unit 50 and the SDRAM 20 when the memory control unit 50 writes data into the SDRAM 20.

(Before T91)

The CPU 30 outputs, to the memory control unit 50, a writing request, a start row address and a start column address indicating a memory cell from which data writing starts, and data to be written composed of the writing data 202, the writing data 203, the writing data 204, and the writing data 201.

The control unit 506 receives the writing request form the CPU 30.

The address buffer unit 501 receives and stores therein the start row address and the start column address.

The address buffer unit 501 sends the start column address to the offset control unit 502.

The offset control unit 502 generates an offset value and a writing column address based on the start column address.

Here, the offset value is one, and the writing column address is 0x0A03.

(T91, Between T91 and T92)

The control unit 506 sends a selection instruction of 1 to the selector 505.

The selector 505 receives the selection instruction, and connects the buses 131 and 531 with the bus 122.

The address buffer unit 501 outputs the start row address to the bus 531 in response to an instruction from the control unit 506.

The control unit 506 holds CKE and DQM high.

The control unit 506 holds CAS and WE high, and CS and RAS low, to generate an active command.

(T92, Between T92 and T93)

At the time T92, the SDRAM 20 receives the active command.

(T93)

The control unit 506 holds CS high.

(Between T93 and T95)

The control unit 506 sends a selection instruction of 2 to the selector 505.

The selector 505 connects the buses 131 and 532 with the bus 122.

(T95, Between T95 and T96)

The offset control unit 502 outputs the writing column address to the bus 532 in response to an instruction from the control unit 506.

At the time T95, the control unit 506 holds DQM high.

At the time T96, the control unit 506 holds CS, CAS and WE low, and RAS high, to generate a write command.

(T96, Between T96 and T97)

At the time T96, the SDRAM 20 receives the write command and the writing column address.

As DQM is held high at the time T96, the SDRAM 20 does not write data into the memory cell 304 that is indicated by the writing column address.

Between the time T96 and the time T97, the control unit 506 sends a selection instruction of 3 to the selector 505.

The selector 505 connects the bus 533 with the bus 122.

(T97)

The control unit 506 holds CS and CAS high.

The control unit 506 holds DQM low.

(Between T97 and T99)

The writing data buffer unit 503 outputs the writing data 201 to the bus 533 in response to an instruction from the control unit 506.

At the time T98, the SDRAM 20 writes the writing data 201 into the memory cell 301, which is judged as having an address next to the address of the memory cell 304 in a wraparound method.

(T99, Between T99 and T101)

The writing data buffer unit 503 outputs the writing data 202 to the bus 533 in response to an instruction from the control unit 506.

At the time T100, the SDRAM 20 writes the writing data 202 to the memory cell 302 which has an address next to that of the memory cell 301.

(T101, Between T101 and T103)

The writing data buffer unit 503 outputs the writing data 203 to the bus 533 in response to an instruction from the control unit 506.

At the time T102, the SDRAM 20 writes the writing data 203 to the memory cell 303 which has an address next to that of the memory cell 302.

(T103, Between T103 and T105)

The writing data buffer unit 503 outputs the writing data 204 to the bus 533 in response to an instruction from the control unit 506.

At the time T104, the SDRAM 20 writes the writing data 204 to the memory cell 304 which has an address next to that of the memory cell 303.

(T105)

The control unit 506 holds DQM high.

The control unit 506 holds CS and WE low, and RAS and CAS high, to generate a burst stop command.

(Between T105 and T107)

At the time T106, the SDRAM 20 receives the burst stop command.

3. Third Embodiment 3.1. Construction

Figure 10:
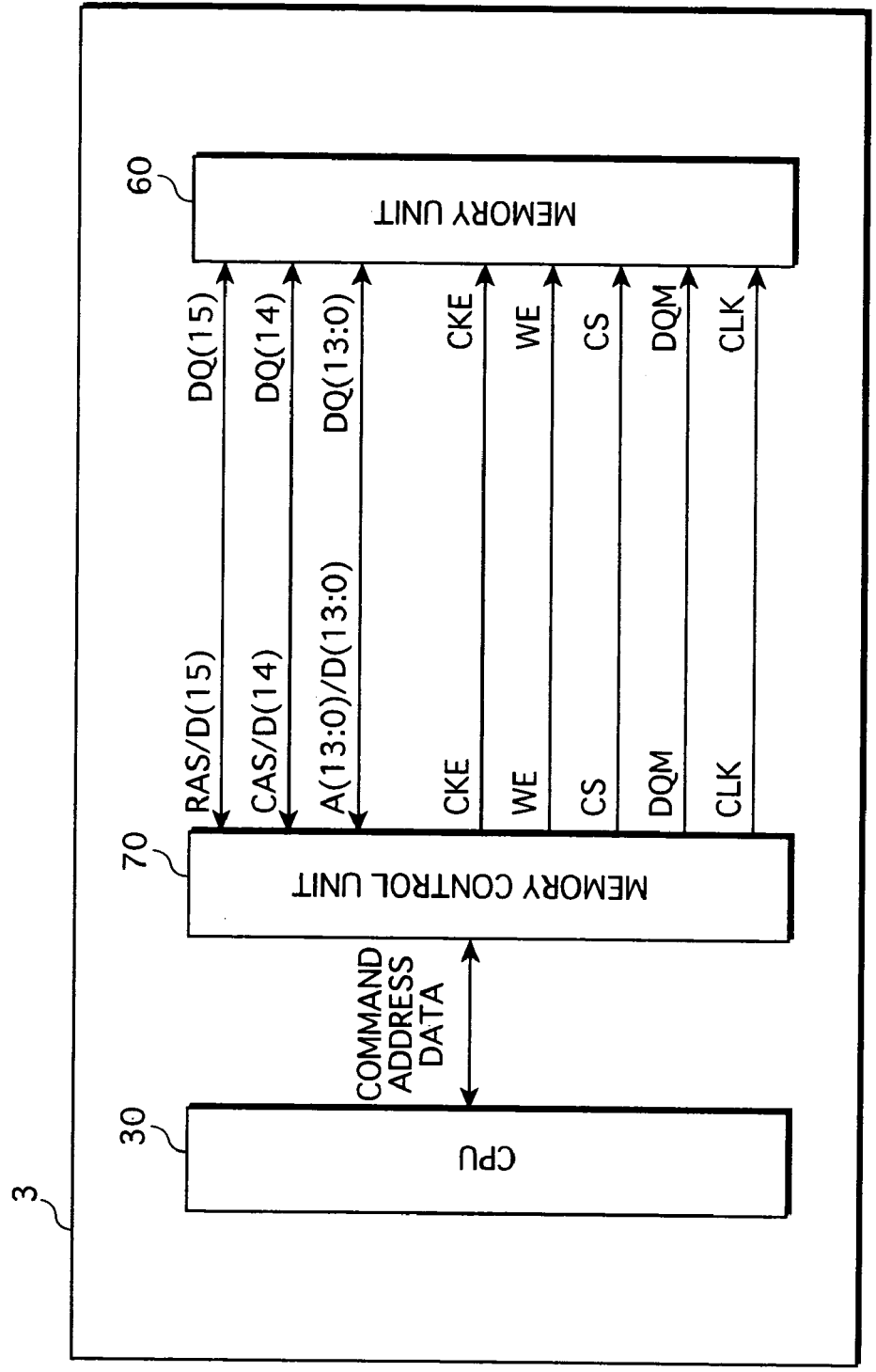
FIG. 10 illustrates a construction of an information processing apparatus using a memory unit.

FIG. 10 illustrates a construction of an information processing apparatus 3, which includes a memory unit 60 relating to a third embodiment of a memory of the present invention.

The memory unit 60 is electrically connected to a memory control unit 70 by a bus as shown in FIG. 10.

The memory unit 60 has a memory area shown in FIG. 3.

The CPU 30 requests the memory control unit 70 to write the writing data 202, the writing data 203, the writing data 204, and the writing data 201 (shown in FIG. 2) into the memory cells 302, 303, 304 and 301 respectively, in the stated order.

In response to a request from the CPU 30, the memory control unit 70 respectively writes the writing data 202, the writing data 203, the writing data 204, and the writing data 201 into the memory cells 302, 303, 304, and 301 in the memory unit 60, in the stated order.

Also, the CPU 30 requests the memory control unit 70 to read data stored in the memory cells 302, 303, 304, and 301.

In response to a reading request from the CPU 30, the memory control unit 70 reads data from the memory cells 302, 303, 304, and 301, and sends the read data to the CPU 30.

Specifically speaking, the memory unit 60 is an SDRAM, and the memory control unit 70 is an LSI formed by a logic circuit or the like.

In the memory unit 60, a burst length is set to four.

Figure 11:
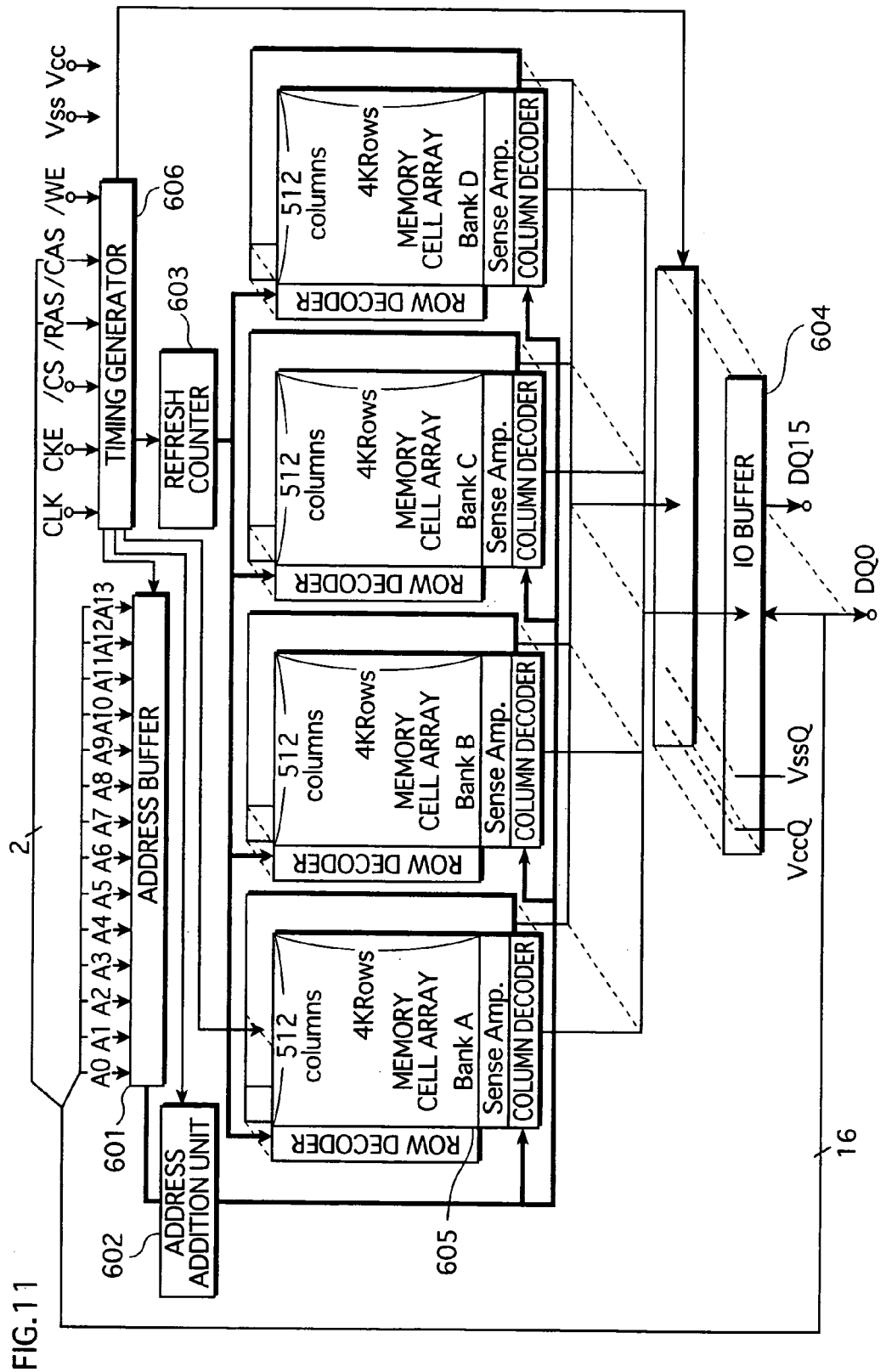
FIG. 11 is a block diagram illustrating a construction of the memory unit.

FIG. 11 is a block diagram illustrating a construction of the memory unit 60.

As shown in FIG. 11, DQ0 is connected to A0, and DQ1 is connected to A1. DQ2 to DQ13 are connected to A2 to A13 respectively. D14 is connected to RAS, and D15 is connected to CAS.

(Address Buffer 601)

An address buffer 601 receives a latch instruction and address information from a timing generator 606 (mentioned later).

Address information is one of a row address and a column address.

The address buffer 601 latches signals input to DQ0 to DQ15, on reception of a latch instruction from the timing generator 606.

When address information is a row address, the address buffer 601 latches the row address and sends the latched row address to a memory cell array 605 (mentioned later). When address information is a column address, the address buffer 601 latches the column address and sends the latched column address to an address addition unit 602 (mentioned later).

(Address Addition Unit 602)

The address addition unit 602 receives a column address from the address buffer 601, and stores it as an input/output address.

On receiving an increment instruction from the timing generator 606, the address addition unit 602 increments the input/output address stored therein, with reference to a burst length stored in the timing generator 606, using a wraparound method.

The address addition unit 602 outputs the incremented input/output address to the memory cell array 605.

(Refresh Counter 603)

A refresh counter 603 generates a row address of a memory cell to be refreshed, to perform a refresh operation. After this, the refresh counter 603 informs the memory cell array 605 of the generated row address.

(IO Buffer 604)

An IO buffer 604 receives a latch instruction and an operation signal from the timing generator 606.

An operation signal indicates one of a reading operation and a writing operation.

The IO buffer 604 performs the following operations when it receives a latch instruction. If the IO buffer 604 receives an operation signal indicating a reading operation, the IO buffer 604 latches signals output from the memory cell array 605, and sends them to DQ0 to DQ15. If the IO buffer 604 receives an operation signal indicating a writing operation, the IO buffer 604 latches signals input to from DQ0 to DQ15, and sends them to the memory cell array 605.

(Memory Cell Array 605)

Figure 12:
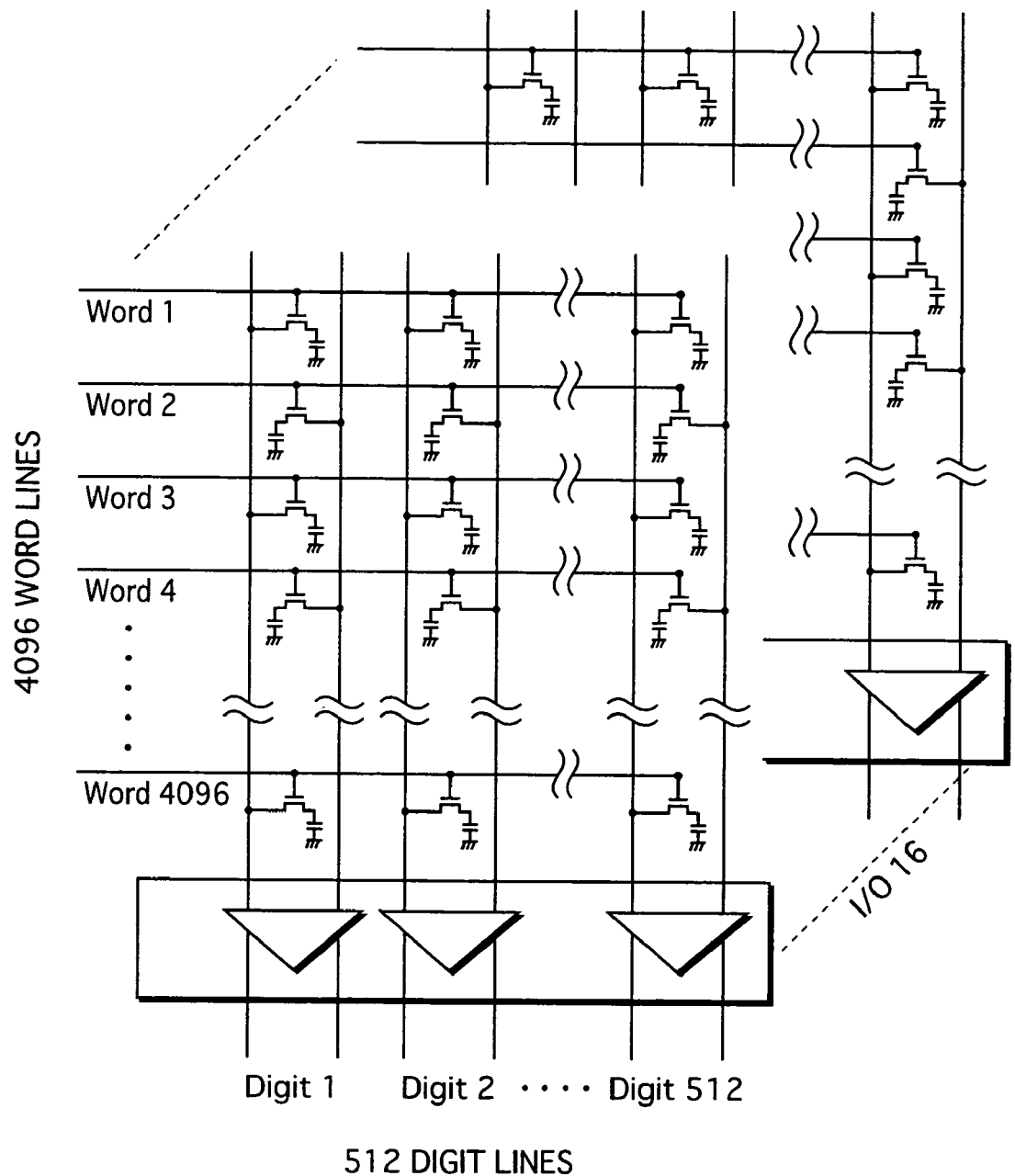
FIG. 12 briefly illustrates a construction of a memory cell array.

FIG. 12 briefly illustrates a construction of the memory cell array 605.

A memory cell in the memory cell array 605 has the same circuit construction as a memory cell in a general-purpose DRAM. That is to say, a memory cell is constituted by one transistor and one condenser.

On receiving a row address from the address buffer 601, a row decoder of the memory cell array 605 reads the row address, and selects a word line corresponding to the row address. On receiving a column address from the address addition unit 602, a column decoder of the memory cell array 605 reads the column address, and selects a digit line corresponding to the column address. Thus, an address is decoded.

When the memory cell array 605 receives a writing instruction from the timing generator 606, the memory cell array 605 writes data latched by the IO buffer 604 into an address that has been decoded. When receiving a reading instruction, the memory cell array 605 outputs data stored in an address that has been decoded to the IO buffer 604.

The memory cell array 605 includes the memory cells 301, 302, 303 and 304.

(Timing Generator 606)

The timing generator 606 receives control signals including CLK, CKE, CS, RAS, CAS, and WE from the CPU 30. The timing generator 606 gives an instruction to the address buffer 601, the address addition unit 602, the refresh counter 603, the IO buffer 604, and the memory cell array 605, based on the above-mentioned control signals.

3.2. Operation 3.2.1. Write Operation

Figure 13:
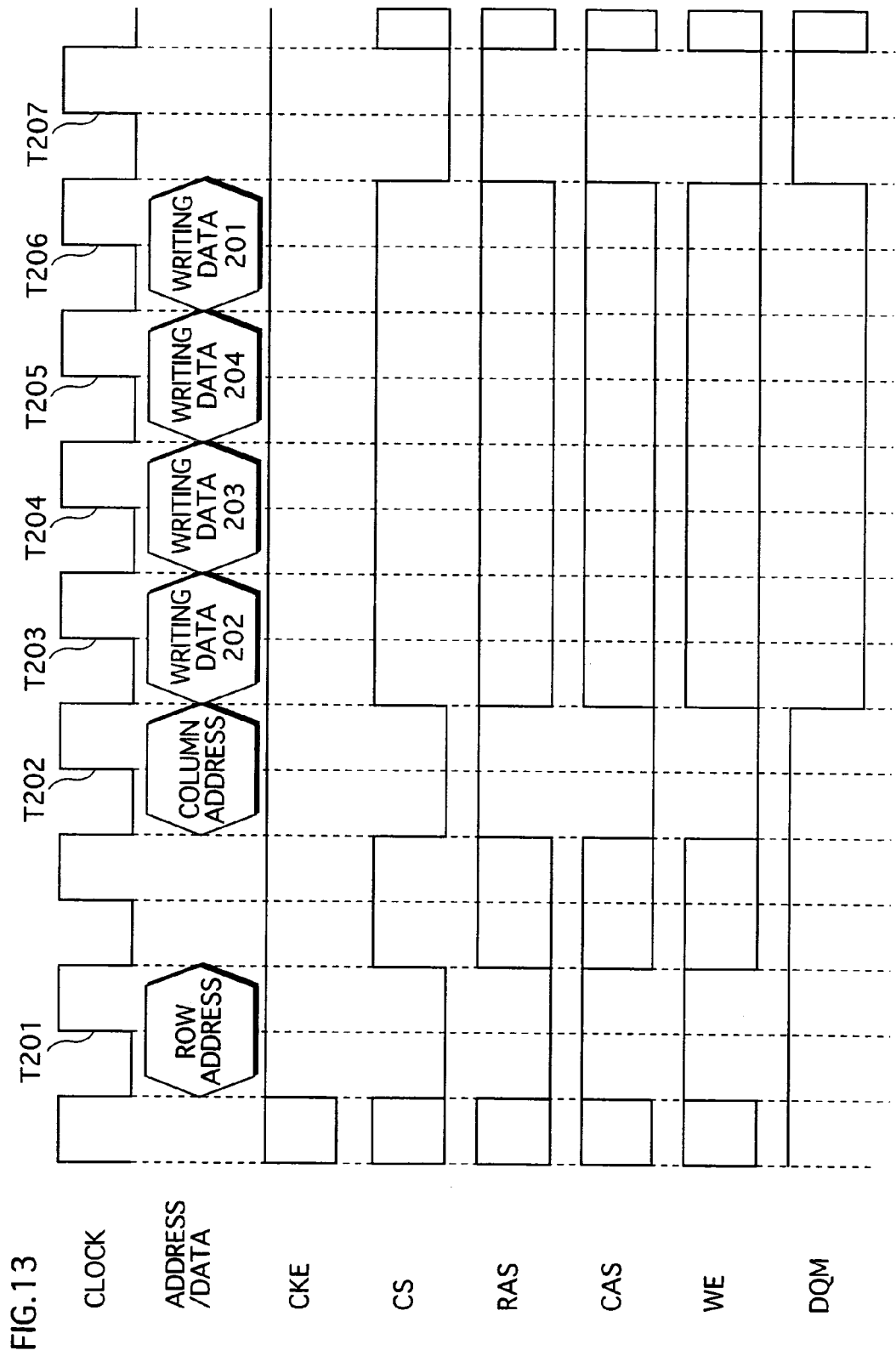
FIG. 13 is a timing diagram for signals transmitted between the memory control unit and the memory unit when the memory control unit writes data into the memory unit.

FIG. 13 is a timing diagram for signals transmitted between the memory control unit 70 and the memory unit 60 when the memory control unit 70 writes data into the memory unit 60.

At the time T201, the memory control unit 70 outputs an active command and a row address.

The timing generator 606 outputs a latch instruction and address information indicating a row address to the address buffer 601.

The address buffer 601 latches the row address, and outputs the latched row address to the memory cell array 605.

At the time T202, the memory control unit 70 outputs a write command and a column address.

The timing generator 606 outputs a latch instruction and address information indicating a column address to the address buffer 601.

The address buffer 601 latches the column address, and outputs the latched column address to the address addition unit 602.

The address addition unit 602 stores the column address as an input/output address, and outputs the input/output address to the memory cell array 605.

Here, it is assumed that the input/output address is 0x0A01, i.e. the column address of the memory cell 302.

At the time T203, the memory control unit 70 outputs the writing data 202.

At this point, the timing generator 606 does not send an increment instruction to the address addition unit 602.

The timing generator 606 outputs a latch instruction and an operation signal indicating a writing operation, to the IO buffer 604.

The IO buffer 604 latches signals input to from DQ0 to DQ15 in accordance with the latch instruction, and outputs the latched signals to the memory cell array 605.

The timing generator 606 outputs a writing instruction to the memory cell array 605.

The memory cell array 605 writes the writing data 202 into the memory cell 302.

When the writing data 202 has been written, the timing generator 606 sends an increment instruction to the address addition unit 602.

The address addition unit 602 increments the input/output address stored therein, and outputs 0x0A02, that is to say, the column address of the memory cell 303, to the memory cell array 605.

At the time T204, the memory control unit 70 outputs the writing data 203.

The timing generator 606 outputs a latch instruction and an operation signal indicating a writing operation to the IO buffer 604.

The IO buffer 604 latches signals input to from DQ0 to DQ15 in accordance with the latch instruction, and sends the latched signals to the memory cell array 605.

The timing generator 606 outputs a writing instruction to the memory cell array 605.

The memory cell array 605 writes the writing data 203 into the memory cell 303 indicated by the input/output address.

When the writing data 203 has been written, the timing generator 606 sends an increment instruction to the address addition unit 602.

The address addition unit 602 increments the input/output address stored therein, and outputs 0x0A03, that is to say, the column address of the memory cell 304, to the memory cell array 605.

At the time T205, the memory control unit 70 outputs the writing data 204.

The timing generator 606 outputs a latch instruction and an operation signal indicating a writing operation to the IO buffer 604.

The IO buffer 604 latches signals input to from DQ0 to DQ15 in accordance with the latch instruction, and outputs the latched signals to the memory cell array 605.

The timing generator 606 outputs a writing instruction to the memory cell array 605.

The memory cell array 605 writes the writing data 204 into the memory cell 304 indicated by the input/output address.

When the writing data 204 has been written, the timing generator 606 sends an increment instruction to the address addition unit 602.

The address addition unit 602 increments the input/output address stored therein using a wraparound method, and outputs 0x0A00, that is to say, the column address of the memory cell 301, to the memory cell array 605.

At the time T206, the memory control unit 70 outputs the writing data 201.

The timing generator 606 outputs a latch instruction and an operation signal indicating a writing operation to the IO buffer 604.

The IO buffer 604 latches signals input to from DQ0 to DQ15 in accordance with the latch instruction, and outputs the latched signals to the memory cell array 605.

The timing generator 606 outputs a writing instruction to the memory cell array 605.

The memory cell array 605 writes the writing data 201 into the memory cell 301 indicated by the input/output address.

At the time 207, the memory control unit 70 outputs a burst stop command. Thus, a data writing operation is ended.

3.2.2. Read Operation

The memory cells 301, 302, 303 and 304 respectively store the reading data 311, the reading data 312, the reading data 313 and the reading data 314 as shown in FIG. 2.

Figure 14:
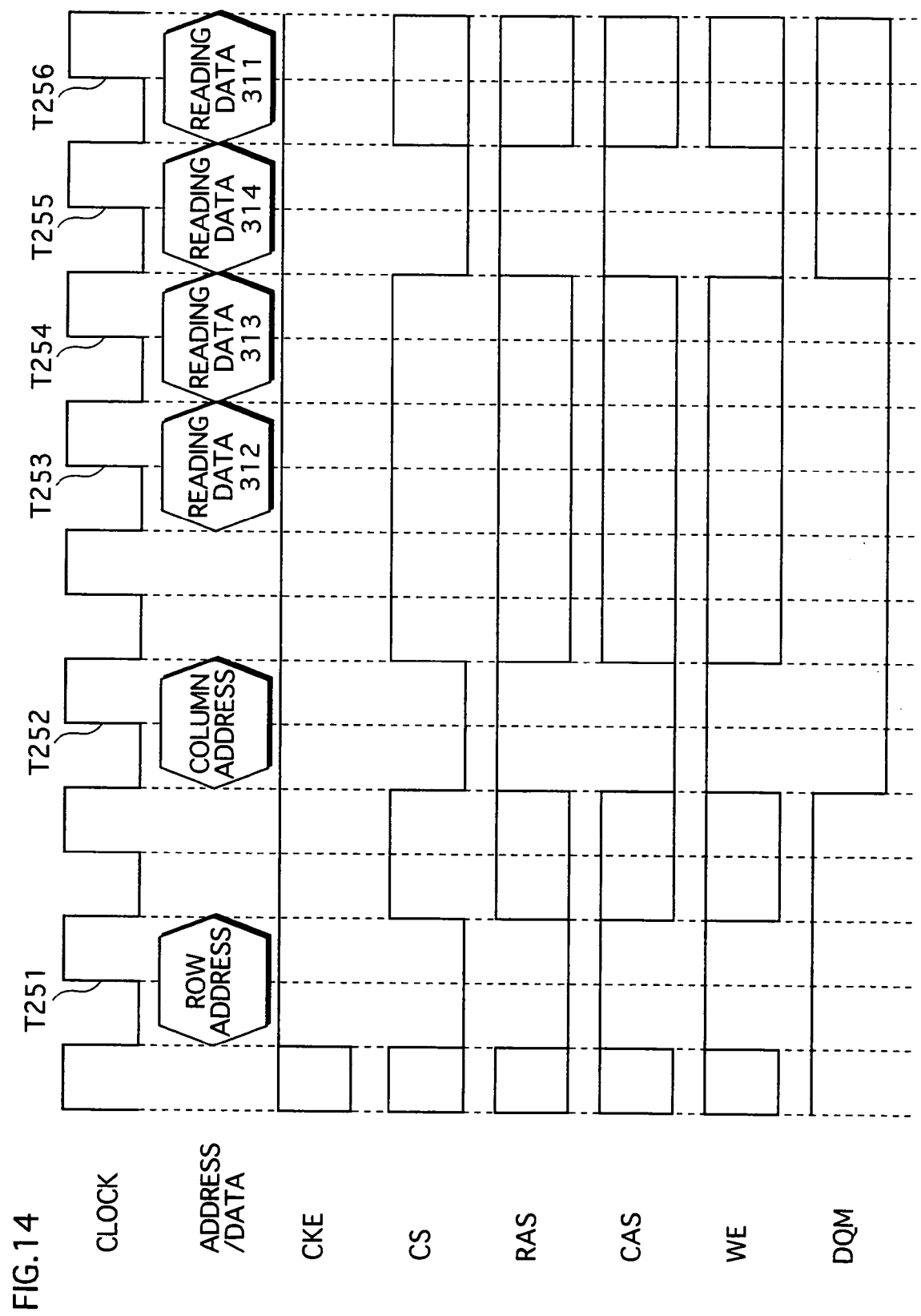
FIG. 14 is a timing diagram for signals transmitted between the memory control unit and the memory unit when the memory control unit reads data from the memory unit.

FIG. 14 is a timing diagram for signals transmitted between the memory control unit 70 and the memory unit 60 when the memory control unit 70 reads data from the memory unit 60.

At the time T251, the memory control unit 70 outputs an active command and a row address.

The timing generator 606 outputs a latch instruction and address information indicating a row address, to the address buffer 601.

The address buffer 601 latches the row address, and outputs the latched row address to the memory cell array 605.

At the time T252, the memory control unit 70 outputs a read command and a column address.

Receiving the read command and the column address, the timing generator 606 outputs a latch instruction and address information indicating a column address to the address buffer 601.

The address buffer 601 latches the column address, and outputs the latched column address to the address addition unit 602.

The address addition unit 602 stores the column address therein as an input/output address, and outputs the input/output address to the memory cell array 605.

Here, it is assumed that the input/output address is 0x0A01, i.e. the column address of the memory cell 302.

The timing generator 606 outputs a reading instruction to the memory cell array 605.

The memory cell array 605 outputs the reading data 312 stored in the memory cell 302 to the IO buffer 604 during two clocks (CAS Latency=2) from the time T252 to the time T253.

At the time T253, the timing generator 606 outputs a latch instruction and an operation signal indicating a reading operation to the IO buffer 604.

The IO buffer 604 latches signals indicating the reading data 312 output from the memory cell array 605 in accordance with the latch instruction, and outputs the latched signals to from DQ0 to DQ15.

The memory control unit 70 receives the reading data 312 that has been output to from DQ0 to DQ15.

The timing generator 606 outputs an increment instruction to the address addition unit 602.

The address addition unit 602 increments the input/output address stored therein, and outputs 0x0A02, that is to say, the column address of the memory cell 303 to the memory cell array 605.

The timing generator 606 outputs a reading instruction to the memory cell array 605.

The memory cell array 605 outputs the reading data 313 stored in the memory cell 303 to the IO buffer 604.

At the time T254, the timing generator 606 outputs a latch instruction and an operation signal indicating a reading operation to the IO buffer 604.

The IO buffer 604 latches signals indicating the reading data 313 output from the memory cell array 605 in accordance with the latch instruction, and outputs the latched signals to from DQ0 to DQ15.

The memory control unit 70 receives the reading data 313 that has been output to from DQ0 to DQ15.

The timing generator 606 outputs an increment instruction to the address addition unit 602.

The address addition unit 602 increments the input/output address stored therein, and outputs 0x0A03, that is to say, the column address of the memory cell 304 to the memory cell array 605.

The timing generator 606 outputs a reading instruction to the memory cell array 605.

The memory cell array 605 outputs the reading data 314 stored in the memory cell 304 to the IO buffer 604.

At the time T255, the memory control unit 70 sends a burst stop command.

The timing generator 606 outputs a latch instruction and an operation signal indicating a reading operation to the IO buffer 604.

The IO buffer 604 latches signals indicating the reading data 314 output from the memory cell array 605 in accordance with the latch instruction, and outputs the latched signals to from DQ0 to DQ15.

The memory control unit 70 receives the reading data 314 that has been output to DQ0 to DQ15.

The timing generator 606 outputs an increment instruction to the address addition unit 602.

The address addition unit 602 increments the input/output address stored therein using a wraparound method, and outputs 0x0A00, that is to say, the column address of the memory cell 301 to the memory cell array 605.

The timing generator 606 outputs a reading instruction to the memory cell array 605.

The memory cell array 605 outputs the reading data 311 stored in the memory cell 301 to the IO buffer 604.

At the time T256, the timing generator 606 outputs a latch instruction and an operation signal indicating a reading operation to the IO buffer 604.

The IO buffer 604 latches signals indicating the reading data 311 output from the memory cell array 605 in accordance with the latch instruction, and outputs the latched signals to from DQ0 to DQ15.

The memory control unit 70 receives the reading data 311 that has been output to from DQ0 to DQ15.

4. Other Modifications

The present invention is described with reference to the above-mentioned embodiments, but not limited thereto.

The present invention includes the following modifications.

(1) The clock generation unit 103 in the first embodiment may be omitted. In this case, the CPU 30 supplies CLK to the memory control unit 10 and the SDRAM 20.

(2) According to the first embodiment, the CPU 30 sends the entire writing data corresponding to one memory block to the memory control unit 10 before the memory control unit 10 starts a write operation. Alternatively, however, the CPU 30 may send writing data corresponding to each memory cell by the time the memory control unit 10 outputs a signal for writing the data corresponding to the memory cell to the SDRAM 20.

(3) According to the second embodiment, the memory control unit 50 receives the entire reading data corresponding to one memory block from the SDRAM 20 before sending reading data to the CPU 30. However, the memory control unit 50 may start sending data read from the SDRAM 20 with reading data corresponding to a start column address, before receiving the entire reading data corresponding to one memory block.

(4) The present invention may be an operation having the steps described in the embodiments, a computer program that performs the operation using a computer, or digital signals formed by the computer program.

The present invention may be the computer program or the digital signals in a state of being stored in a computer readable storage medium, for example, a flexible disk, a hard disk, a CD-ROM, an MO, a DVD, a DVD-ROM, a DVD-RAM, Blue-Ray Disc (BD) or a semiconductor memory. The present invention may be the computer program or the digital signals stored in the above-mentioned storage media.

Alternatively, the present invention may be transmission of the computer program or the digital signals via a network, such as an electronic communication network, a wireless or a fixed-line communication network, and the Internet.

The present invention may be a computer system including a microprocessor and a memory. The memory stores the above-mentioned computer program, and the microprocessor performs an operation corresponding to the computer program.

The present invention may be realized in the following manner. The above-mentioned computer program or digital signals in a state of being stored in the above-mentioned storage media is transferred, or the computer program or the digital signals are transmitted via the above-mentioned networks, so as that a different computer system executes the computer program or the digital signals.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An information processing apparatus comprising:
   a memory unit that has a predetermined burst length and is operable to transfer block data, using a wraparound method, to/from a memory block that is constituted by a plurality of consecutive memory cells in the memory unit and has a length equal to the predetermined burst length; and
   a memory control unit that is connected to the memory unit by a bus used for both address transfer and data transfer, wherein
   the memory control unit includes
   an output subunit operable to output a first command and a second command, when the transfer of the block data to/from the memory block starts with transfer of data to/from an intermediate memory cell in the memory block, the intermediate memory cell being a memory cell other than an initial memory cell in the memory block, the first command instructing the memory unit to transfer data to/from each of the plurality of memory cells in the memory block, except for a memory cell directly before the intermediate memory cell, the second command being output when a predetermined time has elapsed since the output of the first command, and instructing the memory unit to transfer data to/from the memory cell directly before the intermediate memory cell in the memory block, and
   the memory unit transfers the block data in accordance with the first command and the second command.

2. The information processing apparatus of claim 1, wherein
   the memory unit is an SDRAM.

3. The information processing apparatus of claim 1, wherein
   the first command includes a writing instruction and an address indicating the memory cell directly before the intermediate memory cell,
   the second command includes a writing instruction and an address indicating a memory cell two memory cells before the intermediate memory cell.

4. The information processing apparatus of claim 1, wherein
   the first command includes a reading instruction and an address indicating the intermediate memory cell,
   the second command includes a reading instruction and an address indicating the memory cell directly before the intermediate memory cell.

5. An information processing apparatus comprising:
   a memory unit that has a burst length larger than a block length of a memory block and is operable to transfer block data to/from the memory block constituted by a plurality of consecutive memory cells in the memory unit;
   a memory control unit that is connected to the memory unit by a bus used for both address transfer and data transfer;
   a cache unit operable to request the memory control unit to transfer the block data to/from the memory unit;
   a writing unit operable to (i) receive, from the cache unit, an address indicating an intermediate memory cell in the memory block, the block data, and a writing request, the intermediate memory cell being a memory cell other than an initial memory cell in the memory block, and (ii) store data into each of the plurality of memory cells in the memory block in the memory unit in an order of from the initial memory cell to a final memory cell in the memory block; and
   a reading unit operable to (a) receive, from the cache unit, the address indicating the intermediate memory cell in the memory block, and a reading request, (b) read data from each of the plurality of memory cells in the memory block in the memory unit in an order of from the initial memory cell to the final memory cell, and (c) send the read data to the cache unit, using a wraparound method, starting with data read from the intermediate memory cell and ending with data read from a memory cell directly before the intermediate memory cell.

6. The information processing apparatus of claim 5, wherein
   the memory unit is a SDRAM.

7. A memory operable to store data in accordance with signals input thereto, the signals including a control signal such as a clock, an address signal, and a data signal, the memory comprising:
   a transmission unit operable to transmit the signals;
   a detection unit operable to detect an edge of the clock;
   a memory cell group that is constituted by a plurality of memory cells each of which has an assigned address;
   an address storing unit operable to (i) retrieve an address signal when the detection unit detects an edge of the clock at a predetermined timing, and (ii) store therein the retrieved address signal as a writing address;
   an address addition unit operable to increment the writing address, after an edge is detected subsequent to the detection of the edge at the predetermined timing, but before a next edge is detected;
   a data storing unit operable to retrieve a data signal every time the detection unit detects an edge of the clock, after the detection unit detects the edge at the predetermined timing; and
   a control unit operable to perform control so that, every time the data storing unit retrieves a data signal, the retrieved data signal is written into a memory cell indicated by the writing address stored in the address storing unit.

8. The memory of claim 7, wherein
the transmission unit includes:
one signal input/output terminal for two of the address signal, the data signal, and the control signal, one of the two signals being input to the signal input/output terminal at a time; and
a signal line which is connected to two units selected from (i) the address storing unit that stores the writing address indicating the memory cell to which the data signal is to be written, (ii) the data storing unit that stores the data signal that is to be written to the memory cell, and (iii) the control unit that controls the writing of the data signal, so as that the selected two units correspond to the two signals input to the signal input/output terminal.

9. The memory of claim 7, that is formed by including therein an SDRAM.

10. An information processing method for transferring data to/from a memory by means of a bus used for both address transfer and data transfer, the memory operating in accordance with a command, having a predetermined burst length, and transferring block data, by using a wraparound method, to/from a memory block that is constituted by a plurality of memory cells in the memory and has a length equal to the predetermined burst length, the information processing method comprising:
a first output step of, when the transfer of the block data to/from the memory block starts with transfer of data to/from an intermediate memory cell in the memory block, the intermediate memory cell being a memory cell other than an initial memory cell in the memory block, outputting a first command to instruct the memory to transfer data to/from each of the plurality of memory cells in the memory block, except for a memory cell directly before the intermediate memory cell; and
a second output step of, when a predetermined time has elapsed since the output of the first command, outputting a second command to instruct the memory to transfer data to/from the memory cell directly before the intermediate memory cell in the memory block.

11. A program used in an information processing apparatus that transfers data to/from a memory by means of a bus used for both address transfer and data transfer, the memory operating in accordance with a command, having a predetermined burst length, and transfer block data, by using a wraparound method, to/from a memory block that is constituted by a plurality of memory cells in the memory and has a length equal to the predetermined burst length, the program being stored in a computer-readable medium provided in the information processing apparatus, the program comprising:
a first output step of, when the transfer of the block data to/from the memory block starts with transfer of data to/from an intermediate memory cell in the memory block, the intermediate memory cell being a memory cell other than an initial memory cell in the memory block, outputting a first command to instruct the memory to transfer data to/from each of the plurality of memory cells in the memory block, except for a memory cell directly before the intermediate memory cell; and
a second output step of, when a predetermined time has elapsed since the output of the first command, outputting a second command to instruct the memory to transfer data to/from the memory cell directly before the intermediate memory cell in the memory block.

* * * * *